United States Patent
Kim et al.

(10) Patent No.: US 11,126,293 B2
(45) Date of Patent: Sep. 21, 2021

(54) ELECTRONIC DEVICE HAVING LIGHT ABSORBING MEMBER ARRANGED BETWEEN DISPLAY PANEL AND ULTRASONIC SENSOR

(71) Applicant: Samsung Electronics Co., Ltd., Gyeonggi-do (KR)

(72) Inventors: Jinman Kim, Gyeonggi-do (KR); Joohan Kim, Gyeonggi-do (KR); Bongjae Rhee, Gyeonggi-do (KR); Jeonggyu Jo, Gyeonggi-do (KR); Hyojun Koo, Gyeonggi-do (KR); Sunggwan Woo, Gyeonggi-do (KR); Hyunsuk Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/767,915

(22) PCT Filed: Nov. 28, 2018

(86) PCT No.: PCT/KR2018/014759
§ 371 (c)(1),
(2) Date: May 28, 2020

(87) PCT Pub. No.: WO2019/107890
PCT Pub. Date: Jun. 6, 2019

(65) Prior Publication Data
US 2021/0004117 A1    Jan. 7, 2021

(30) Foreign Application Priority Data

Nov. 28, 2017  (KR) .................. 10-2017-0160146
Aug. 3, 2018  (KR) .................. 10-2018-0090973

(51) Int. Cl.
   *G06F 3/041*    (2006.01)
   *G06K 9/00*    (2006.01)
   *G06F 1/16*    (2006.01)

(52) U.S. Cl.
   CPC .......... *G06F 3/0416* (2013.01); *G06F 3/0412* (2013.01); *G06K 9/0002* (2013.01); *G06F 1/1601* (2013.01)

(58) Field of Classification Search
   CPC ... G06K 9/0002; G06F 1/1637; G06F 1/1601; G06F 3/0412; G06F 3/0416; G06F 21/32;
   (Continued)

(56) References Cited

U.S. PATENT DOCUMENTS

2014/0354596 A1    12/2014   Djordjev et al.
2014/0355376 A1    12/2014   Schneider et al.
(Continued)

FOREIGN PATENT DOCUMENTS

KR    1020150080812    7/2015
KR    1020160016969    2/2016
(Continued)

OTHER PUBLICATIONS

PCT/ISA/210 Search Report issued on PCT/KR2018/014759 pp. 11.
(Continued)

*Primary Examiner* — Charles V Hicks
(74) *Attorney, Agent, or Firm* — The Farrell Law Firm, P.C.

(57) ABSTRACT

An electronic device according to one embodiment of the present disclosure comprises: a transparent member; a display panel arranged below the transparent member; an ultrasonic sensor, arranged below the display panel, for acquiring biometric information by using ultrasonic waves having passed through the display panel and the transparent
(Continued)

member for an external object close to the transparent member; and a light absorbing member for absorbing, through the transparent member and the display panel, at least a part of external light incident on the ultrasonic sensor, wherein the light absorbing member can be arranged between the display panel and the ultrasonic sensor. Other various examples are possible.

15 Claims, 35 Drawing Sheets

(58) Field of Classification Search
CPC ...... G06F 1/203; G06F 1/1698; G06F 1/1626; G06F 3/043; H04M 1/026; H04M 2250/12; H04M 1/0266; H04R 17/00
See application file for complete search history.

(56) References Cited

U.S. PATENT DOCUMENTS

| | | | |
|---|---|---|---|
| 2015/0064432 A1* | 3/2015 | Matsuyuki | C03C 17/3435 |
| | | | 428/216 |
| 2015/0189136 A1 | 7/2015 | Chung et al. | |
| 2015/0199552 A1 | 7/2015 | Du et al. | |
| 2016/0026045 A1* | 1/2016 | Inamura | G02F 1/136204 |
| | | | 349/12 |
| 2016/0107194 A1 | 4/2016 | Panchawagh et al. | |
| 2016/0300096 A1 | 10/2016 | Kim et al. | |
| 2017/0124372 A1 | 5/2017 | Evans, V et al. | |
| 2017/0220844 A1 | 8/2017 | Jones et al. | |
| 2017/0278900 A1 | 9/2017 | Yang et al. | |
| 2019/0303640 A1 | 10/2019 | Song et al. | |

FOREIGN PATENT DOCUMENTS

| | | |
|---|---|---|
| KR | 1020160048984 | 5/2016 |
| KR | 1020160091253 | 8/2016 |
| KR | 1020160098519 | 8/2016 |
| KR | 1020160120084 | 10/2016 |
| KR | 1020170066434 | 6/2017 |
| KR | 1020170093192 | 8/2017 |
| KR | 1020170104314 | 9/2017 |
| KR | 1020170113821 | 10/2017 |
| KR | 1020170125778 | 11/2017 |

OTHER PUBLICATIONS

PCT/ISA/237 Written Opinion issued on PCT/KR2018/014759, pp. 16.
European Search Report dated Jan. 12, 2021 issued in counterpart application No. 18883518.5-1216, 7 pages.

* cited by examiner

ELECTRONIC DEVICE HAVING LIGHT ABSORBING MEMBER ARRANGED BETWEEN DISPLAY PANEL AND ULTRASONIC SENSOR

PRIORITY

This application is a National Phase Entry of International Application No. PCT/KR2018/014759, which was filed on Nov. 28, 2018, and claims priority to Korean Patent Application Nos. 10-2017-0160146 and 10-2018-0090973, filed in the Korean Intellectual Property Office on Nov. 28, 2017 and Aug. 3, 2018, respectively, the content of each of which is incorporated herein by reference.

TECHNICAL FIELD

Embodiments of the disclosure relate to an electronic device having a light absorbing member disposed between a display panel and an ultrasonic sensor so as to absorb external light.

BACKGROUND ART

A multifunctional electronic device such as a smart phone usually stores various types of personal information such as a phone number and authentication information (for example, a password). As the use of an electronic device has become widespread, authentication services become increasingly important in order to protect personal information stored in an electronic device from other people. For example, an electronic device may have an authentication function using biometric information such as a user's fingerprint. The electronic device may include a fingerprint sensor for recognizing a user's fingerprint. The fingerprint sensor may employ at least one of an electrostatic capacity type method, a pressure sensitive type method, an optical method, or an ultrasonic method. A conventional fingerprint sensor may require a region such as a button, which is exposed from an outer appearance of an electronic device in order to receive a user's fingerprint as input. A separate input through a button may cause a user's inconvenience. In addition, a region occupied by a button for fingerprint input may be an aesthetically weak point of an electronic device or a constraint on the expansion of a display region.

DISCLOSURE OF INVENTION

Technical Problem

An electronic device according to an embodiment of the disclosure may include a fingerprint sensor using an ultrasonic wave which is disposed in an activated region of a display Therefore, the fingerprint sensor may be disposed under a transparent cover and a display panel of the electronic device. The fingerprint sensor may acquire fingerprint information by using an ultrasonic wave having been transmitted through the transparent cover and the display panel. The ultrasonic wave is transmitted through a lamination including the transparent cover and the display panel, and may thus lose the energy. In order to improve a performance of a fingerprint sensor, an electronic device according to various embodiments of the disclosure is required to minimize the energy loss caused by media in an ultrasonic wave transmitting path.

Solution to Problem

An electronic device according to one embodiment of the disclosure may include: a transparent member; a display panel disposed under the transparent member; an ultrasonic sensor disposed under the display panel and acquiring biometric information from an external object adjacent to the transparent member by using an ultrasonic wave having been transmitted through the display panel and the transparent member; and a light absorbing member for absorbing at least a part of external light incident into the ultrasonic sensor through the transparent member and the display panel, wherein the light absorbing member may be disposed between the display panel and the ultrasonic sensor.

An electronic device according to one embodiment of the disclosure may include: a transparent member including a planar region and a curved region disposed on at least one edge of the planar region; a display panel disposed under the transparent member and including a planar region and a curved region formed to correspond to a shape of the transparent member; an ultrasonic sensor disposed under the display panel and acquiring biometric information from an external object adjacent to the transparent member by using an ultrasonic wave having been transmitted through the display panel and the transparent member; and a light absorbing member for absorbing at least a part of external light incident into the ultrasonic sensor through the transparent member and the display panel, wherein the light absorbing member may be disposed between the display panel and the ultrasonic sensor, and the light absorbing member positioned under the planar region may be formed to have a thickness different from that of the light absorbing member positioned under the curved region.

BEST MODE FOR CARRYING OUT THE INVENTION

Figure 1:
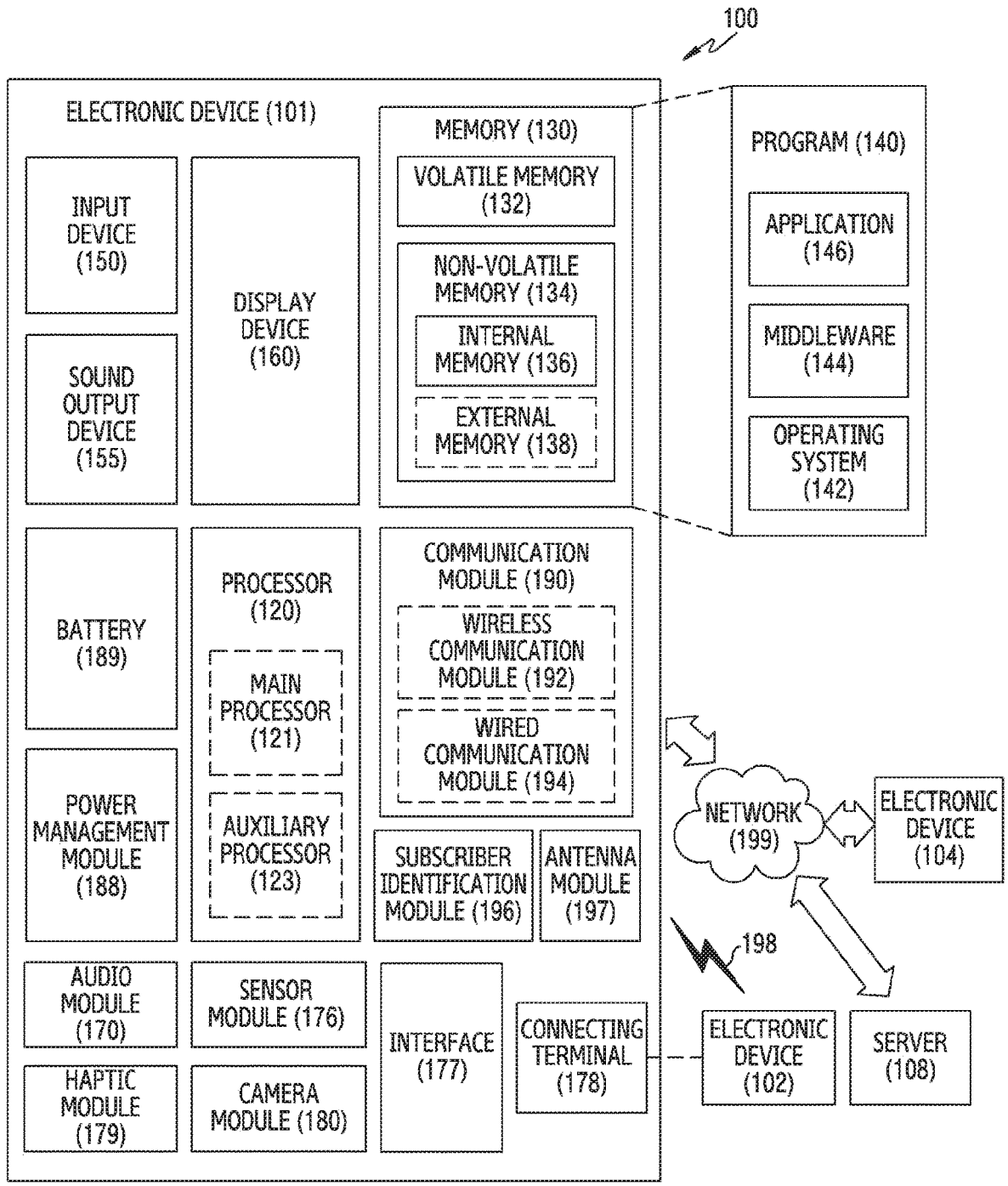
FIG. 1 is a block diagram of an electronic device in a network environment according to an embodiment of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
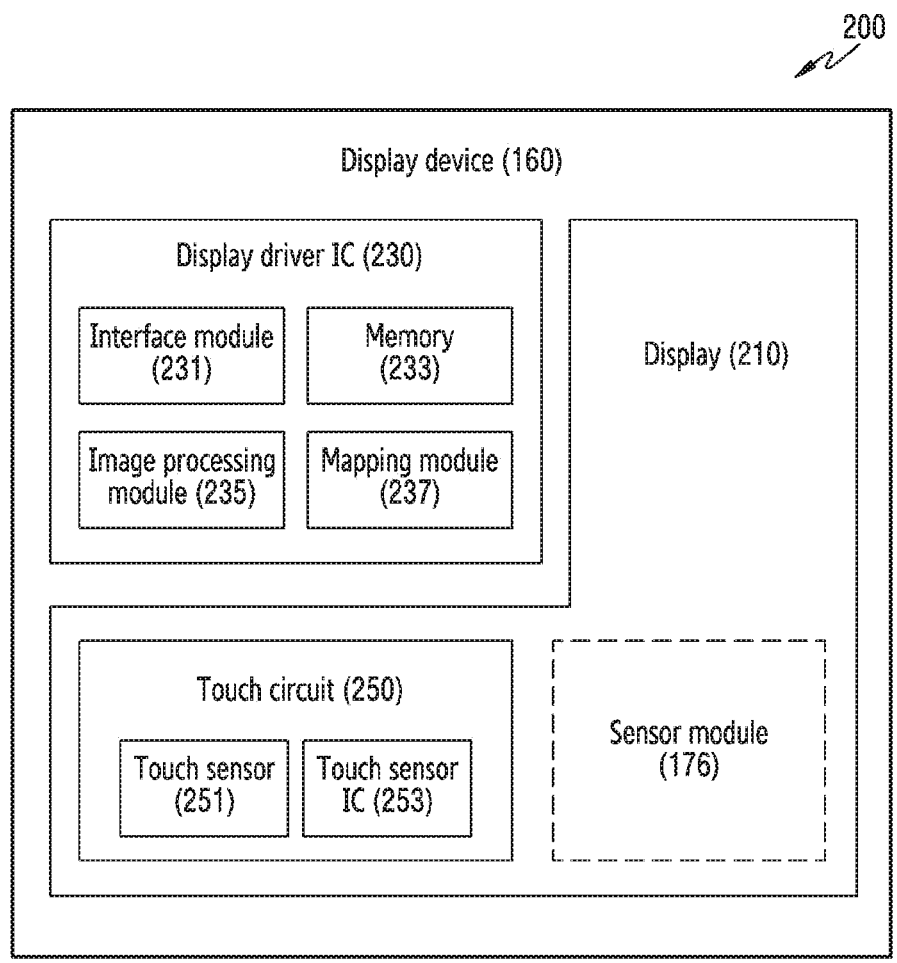
FIG. 2 is a block diagram of a display device according to an embodiment of the disclosure.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DPI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DPI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each sur pixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DPI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
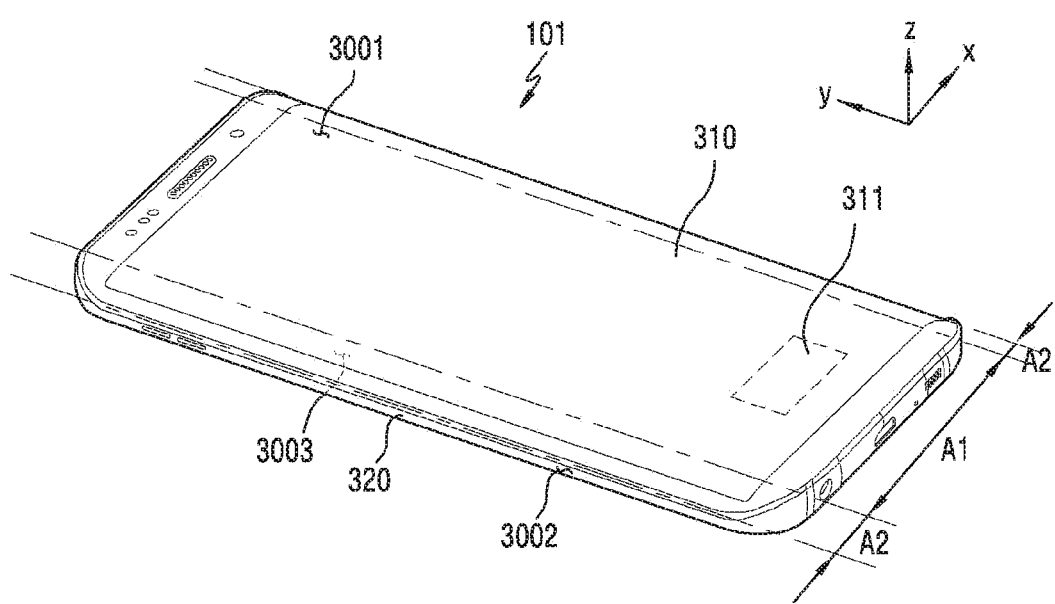
FIG. 3A is a perspective view of an electronic device according to an embodiment of the disclosure.
Figure 3B:
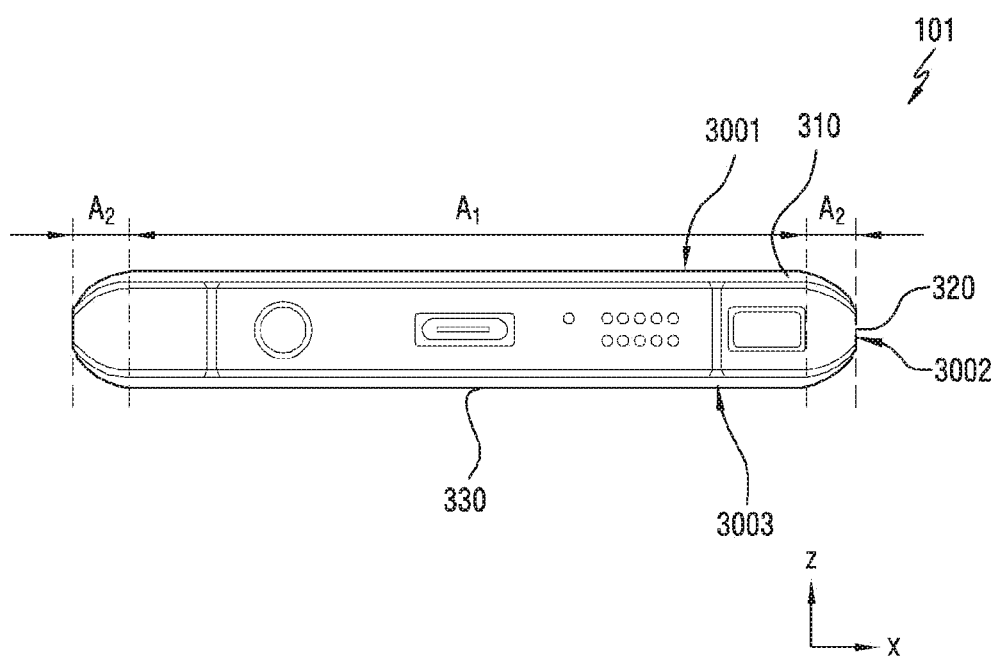
FIG. 3B is a plan view of an electronic device according to an embodiment of the disclosure.

FIG. 3A is a perspective view of an electronic device according to an embodiment of the disclosure, and FIG. 3B is a plan view of an electronic device according to an embodiment of the disclosure. Referring to FIGS. 3A and 3B, an electronic device 101 may include a housing constituting an outer appearance of the electronic device 101. According to one embodiment, the housing may be divided into a front side 3001, a lateral side 3002, and a rear side 3003. For example, the electronic device 101 may include: a front housing 310 oriented toward a first direction (a direction of +z); a rear housing 330 oriented toward a second direction (the back side, a direction of −z) opposite to the first direction; and a lateral housing 320 oriented toward a third direction (a direction of ±x or ±y) which is perpendicular to the first direction (or the second direction) or substantially vertical. The lateral housing 320 may be configured to enclose a space between the front housing 310 and the rear housing 330.

According to one embodiment, each of the housings may constitute the front side 3001, the lateral side 3002, and the rear side 3003, independently, or at least parts of the housings may constitute the sides together. For example, at least a part of the front housing 310 has a curved shape, and may constitute the lateral side 3002 of the electronic device 101 together with the lateral housing 320. For example, referring to one lateral side of the electronic device 101, the front housing 310 may include a planar region A1 (or a planar portion) and a curved region A2 (or a curved portion). The planar region A1 may indicate a region having the curvature which is smaller than the curvature of the curved region A2. In the front housing 310, a region which is substantially flat may be defined as the planar region A1, and a region whose curvature is larger than that of the planar region A1 may be defined as the curved region A2. According to one embodiment, the front housing 310 may include a planar region A1 and curved regions A2 symmetrically extending on opposite sides of the planar region A1. In another embodiment, a curved region A2 may be formed only on one side of a planar region A1. Each of the housings may have any suitable shape for design reasons considering an outer appearance and/or a function, and the housings may be integrally formed or may be separately formed to be assembled together. Therefore, in the disclosure, each of the front housing 310, the rear housing 330, and the lateral housing 320 is not interpreted as being limited to one component.

According to one embodiment, the front housing 310 is formed to be transparent and may be thus configured to allow light or signals emitted from a display device disposed in the inside to be transmitted therethrough or configured to enable the interaction with a user through a touch screen panel included in the display device. For example, the electronic device 101 may detect various types of input such as a user's touch input, writing by using a position indicator (for example, a stylus pen) employing an electromagnetic radiation (EMR) phenomenon, or drawing on the front housing 310. Therefore, the front housing 310 may be referred to also as a transparent member, and hereinafter they may be mixedly used in the description of various embodiments. In an embodiment of the disclosure, at least some region 311 of the front housing 310 may be configured to be a region capable of recognizing a user's fingerprint. The at least some region 311 of the front housing 310 may be defined as a fingerprint detection region.

Figure 4:
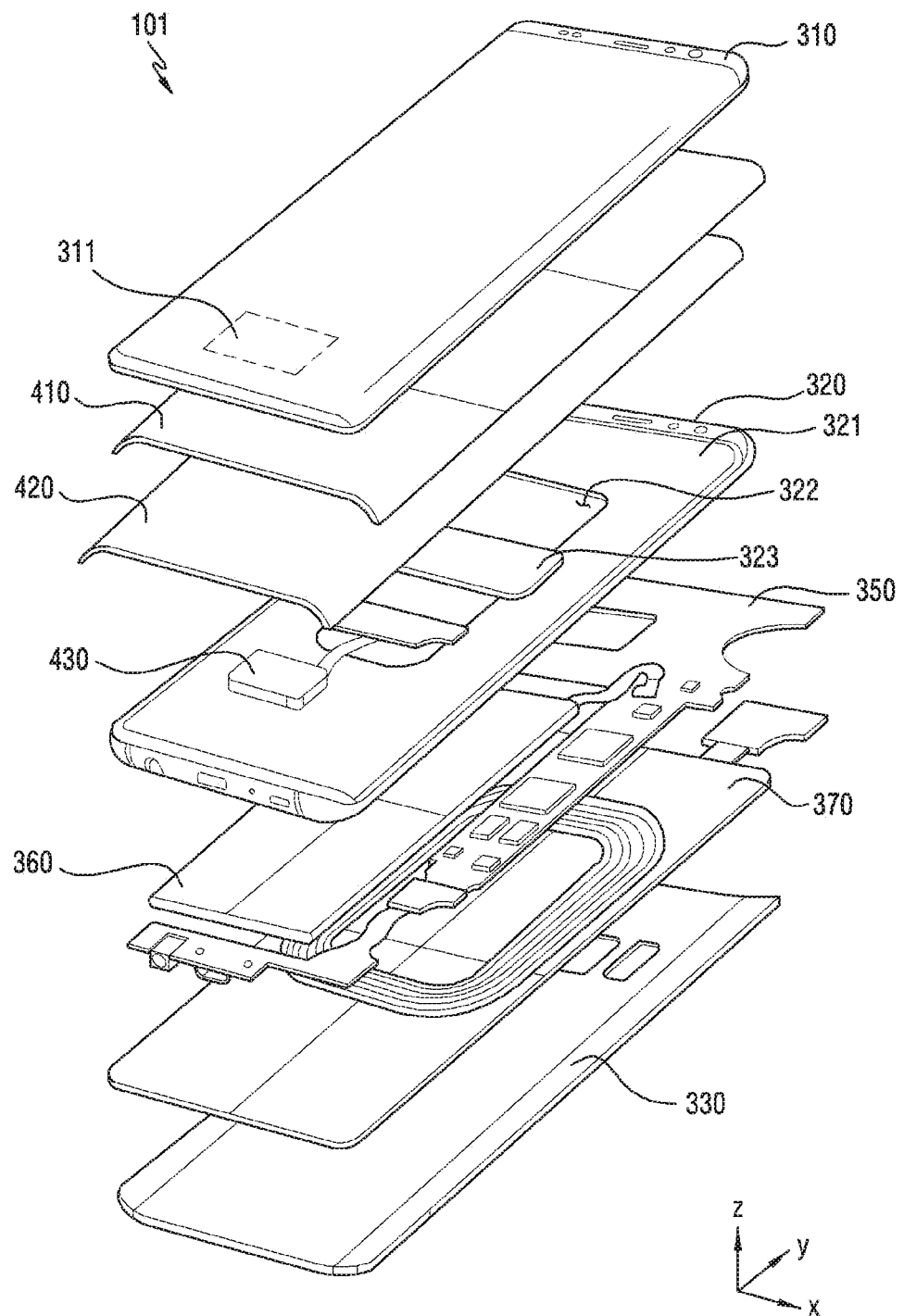
FIG. 4 is an exploded perspective view of an electronic device according to an embodiment of the disclosure.

FIG. 4 is an exploded perspective view of an electronic device according to an embodiment of the disclosure.

Referring to FIG. 4, an electronic device 101 may include a front housing 310 (or a transparent member), a lateral housing 320, a rear housing 330, a printed circuit board 350, a battery 360 (for example, the battery 189 of FIG. 1), and an antenna 370 (for example, the antenna module 197 of FIG. 1). At least one of the components of the electronic device 101 may be equal or similar to at least one of the components of the electronic device 101 of FIG. 1, and overlapping descriptions are omitted.

The electronic device 101 may include a plurality of panels interposed between the front housing 310 and the rear housing 330. According to one embodiment, the plurality of panels may include a display panel 410, a light absorbing member 420, and a fingerprint sensor 430. The display panel 410 and the light absorbing member 420 may be sequentially laminated (or attached) under the front housing 310. In an embodiment, a polarizing layer may be interposed between the front housing 310 and the display panel 410. The polarizing layer may further include an electrode pattern formed on one surface thereof for touch detection.

According to one embodiment, when the front housing 310 is viewed from above (in a direction of −z), the fingerprint sensor 430 may be attached under the light absorbing member 420 at a position corresponding to the fingerprint detection region 311. The fingerprint sensor 430 may be configured to recognize a user's biometric information from the user's touch input in the fingerprint detection region 311.

In an embodiment, at least one panel, such as a buffer member (not shown), a heat-radiating plate (not shown), and/or a digitizer panel (not shown), may be further laminated under the light absorbing member 420. A cushion layer, a heat-radiating plate, and/or a digitizer panel may be laminated under the light absorbing member 420, excepting a region where the fingerprint sensor 430 is disposed. At least one of a buffer member, a heat-radiating plate, and a digitizer panel may be configured to enclose the fingerprint sensor 430 attached to the light absorbing member 420.

The lateral housing 320 may include a support portion 321 which is integrally formed in the inside thereof or formed by a separate member coupled thereto. The support portion 421 may have one surface to which the front housing 310 is coupled, and a rear surface to which the printed circuit board 350 is coupled. A processor (for example, the processor 120 of FIG. 1), a memory (for example, the memory 130 of FIG. 1), and/or an interface (for example, the interface 177 of FIG. 1) may be mounted (or arranged) on the printed circuit board 350. For example, the processor may include one or more of a central processing unit, an application processor, a graphic processing unit, an image signal processor, a sensor hub processor, or a communication processor. The memory may include a volatile memory or a nonvolatile memory. The interface may include a high definition multimedia interface (HDMI), a universal serial bus (USB) interface, an SD card interface, and/or an audio interface. The interface may electrically or physically connect the electronic device 101 to an external electronic device, and include an USB connector, an SD card/MMC connector, or an audio connector.

The battery 360 is a device for supplying power to at least one component of the electronic device 101, and may include a non-rechargeable primary battery, a rechargeable secondary battery, or a fuel battery. At least a part of the battery 360 may be disposed on a plane which is substantially the same as a plane on which the printed circuit board 350 is disposed. The battery 360 may be integrally disposed inside the electronic device 101, and may be also disposed to be detachable from the electronic device 101. According to one embodiment, the support portion 421 may include an opening (or a housing slot) 422 formed in at least some region thereof. The opening 422 may be applied as a space for compensating a swelling phenomenon of the battery 360.

The antenna 370 may be disposed between the rear housing 330 and the battery 360. For example, the antenna 370 may include a near field communication (NFC) antenna, a wireless charging antenna, and/or a magnetic secure transmission (MST) antenna. The antenna 370 may perform a near field communication with an external device, or wirelessly transmit or receive power required for charging. In another embodiment, a part of the support portion 421 and/or the lateral housing 320 may further include an antenna radiator so as to form an antenna structure together with the antenna 370. According to one embodiment, a conductor 423 may be prepared to cover at least a part of the opening 422 of the support portion 421. The conductor 423 may shift a parasitic resonance frequency, which may occur at the opening 422, into outband so as to function to prevent the antenna performance degradation.

Figure 5A:
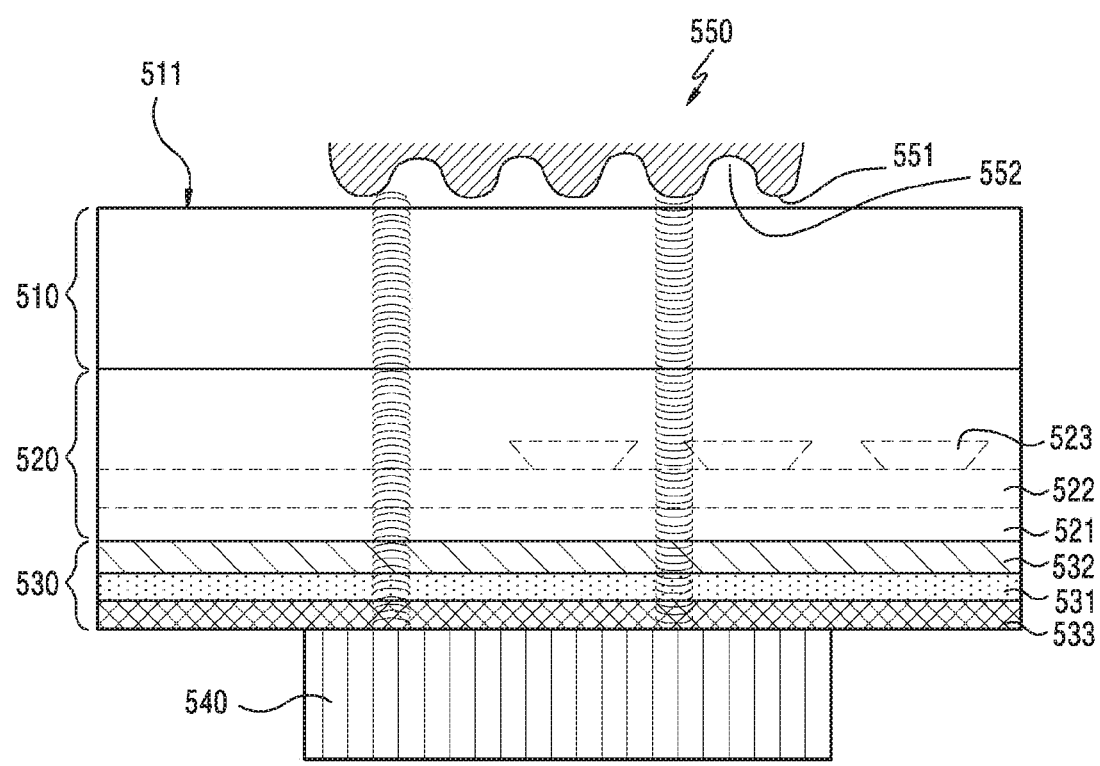
FIG. 5A is a cross-sectional view illustrating an example of an arrangement structure of a fingerprint sensor included in an electronic device according to embodiments of the disclosure.
Figure 5B:
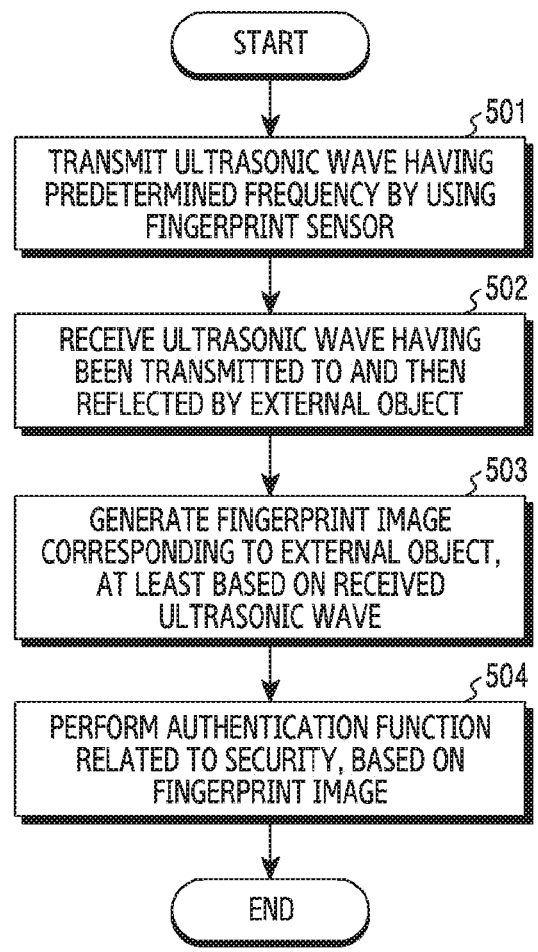
FIG. 5B is a flowchart illustrating an example of an operation for performing an authentication function by using a fingerprint sensor in an electronic device according to an embodiment of the disclosure.

FIG. 5A is a cross-sectional view illustrating an example of an arrangement structure of a fingerprint sensor included in an electronic device according to an embodiment of the disclosure. FIG. 5B illustrates an example of an operation for performing an authentication function by using a fingerprint sensor in an electronic device according to an embodiment of the disclosure. FIG. 5A may be a transverse cross-sectional view of at least some region including the fingerprint detection region 311 of the electronic device 101 of FIG. 4.

Referring to FIG. 5A, in one embodiment, a transparent member 510 (or a front housing) may transmit at least one light which is displayed on a display panel 520. The transparent member 510 may be made of at least one material among glass or a polymer material, namely a high molecular substance such as polycarbonate (PC), polymethyl methacrylate (PMMA), polyimide (PE), polyethylene terephthalate (PET), and polypropylene terephthalate (PPT). According to one embodiment, the transparent member 510 may include a multilayer structure made of various materials.

According to one embodiment, the display panel 520 may include: a base substrate 521; a thin film transistor (TFT) layer 522 disposed on the base substrate 521; and a pixel layer 523 (or an organic light emitting layer) receiving a signal voltage applied from the thin film transistor layer 522. The thin film transistor layer 522 may include an active layer, a gate insulation film, a gate electrode, an interlayer insulation film, a source electrode, a drain electrode, and the like, and may transmit a signal required for the operation of the pixel layer 523. The pixel layer 523 may include a plurality of display elements such as a light emitting diode. The pixel layer 523 may be defined as a region in which a plurality of organic display elements arranged on the thin film transistor layer 522 are arranged. The display panel 520 may further include any suitable components such as a thin film encapsulation layer for encapsulating the pixel layer 523, and a back film for supporting the base substrate 521.

According to one embodiment, an adhesive member (or an adhesive agent) may be used in order to bond the transparent member 510, the display panel 520, and each of layers thereof to each other. For example, the adhesive member may include a double-sided adhesive film, a pressure sensitive adhesive (PSA), an optical clear adhesive (OCA) film, or an optical clear resin (OCR).

According to one embodiment, a light absorbing member 530 may include: a base layer 531 made of a polymer material (for example, PET); and a first adhesive layer 532 (or an upper adhesive layer) and a second adhesive layer 533 (or a lower adhesive layer) which are disposed on opposite surfaces of the base layer 531. According to one embodiment, when a user looks at the transparent member 510, the light absorbing member 530 may include a black coated layer to enable an inner part (for example, a fingerprint sensor 540) of an electronic device to be invisible through the transparent member 510 and the display panel 520 which becomes transparent when the display panel does not operate. The light absorbing member 530 may be referred to as a visibility preventing layer.

The fingerprint sensor 540 according to one embodiment may be disposed under a lamination of the transparent member 510, the display panel 520, and the light absorbing member 530. The fingerprint sensor 540 may be disposed under the light absorbing member 530 by means of the adhesive force of the second adhesive layer 533 of the light absorbing member 530. The light absorbing member 530 enables the fingerprint sensor 540 to be invisible to a user through the transparent member 510 and the display panel 520. In addition, when the fingerprint sensor 540 is attached to the display panel 520 (or a lamination including the display panel), the light absorbing member 530 may absorb impact applicable to the display panel 520 so as to prevent damage to the display panel 520.

FIG. 5B describes a flow of an operation for performing an authentication function by using the fingerprint sensor 540 in an electronic device (for example, 101 of FIG. 1). In operation 501, an electronic device may transmit an ultrasonic wave having a predetermined frequency by using the fingerprint sensor 540. For example, a processor operatively connected to the fingerprint sensor may provide a signal of enabling the fingerprint sensor 540 to generate at least one ultrasonic wave. Upon receiving the signal from the processor, the fingerprint sensor 540 may generate at least one ultrasonic wave which is to be transmitted to an exposed surface 511 of the transparent member 510. The ultrasonic wave may be a sound wave having a frequency of approximately 20,000 Hz or higher, which is a frequency out of the audible range of humans. The ultrasonic wave having been transmitted to the exposed surface 511 of the transparent member 510 may be reflected by a ridge 551 and a valley 552 of an external object 550 (for example, a user's finger).

In operation 502, the electronic device may receive the ultrasonic wave having been transmitted to and then reflected by the external object. The fingerprint sensor 540 may receive the reflected ultrasonic wave and then convert the energy of the reflected ultrasonic wave into localized electric charges. These electric charges may be collected by pixel input electrodes of the fingerprint sensor 504, and be transmitted to pixel circuits. The electric charges may be amplified by the pixel circuits.

In operation 503, the electronic device may generate a fingerprint image corresponding to the external object, at least based on the received ultrasonic wave. The fingerprint sensor 540 may output a digital signal in order to constitute an image (for example, a fingerprint image) of the external object 550. The fingerprint sensor 540 may provide the digital signal for the processor. The processor may generate a fingerprint image by using the digital signal. In an embodiment, an application specific integrated circuit (ASIC) for the fingerprint sensor 540 may generate the fingerprint image by using the digital signal. The ASIC may provide the generated fingerprint image for the processor.

In operation 504, the electronic device may perform an authentication function related to security, based on the fingerprint image. For example, the processor may receive an output fingerprint image or a fingerprint image transmitted from a processor for the fingerprint sensor 540. The processor may use the received fingerprint image to perform comparison with a reference image in order to perform fingerprint authentication. The reference image may be stored in advance by an authenticated user of the electronic device and include an image of the authenticated user's fingerprint, an image registered for fingerprint registration setting, and the like. The reference image may be stored in a security region of the memory 130 included in the electronic device.

The transmission of sound or a sound wave may be performed based on a medium's characteristic such as the acoustic impedance. When a sound wave is transmitted from one medium to the other medium, if these media have a great difference in acoustic impedance (or the acoustic resistance), the transmission of a sound wave may have the low transmission rate. The low transmission rate may indicate that at an interface between the one medium and the other medium, an incident wave is not transmitted to the other medium, but rather most of the incident wave is reflected. Therefore, in order to transmit a sound wave well, the impedance matching between media may be important.

Referring to FIG. 5A, in an embodiment of the disclosure, an ultrasonic wave may be transmitted through a complex between the fingerprint sensor 540 and the exposed surface 511, as a medium. In other words, an ultrasonic wave and a reflected ultrasonic wave that the fingerprint sensor 540 generates and receives, respectively, may use a complex lamination including the transparent member 510, the display panel 520, and the light absorbing member 530, as a transmitting path. When there is the great acoustic impedance mismatching at the transparent member 510, the display panel 520, the light absorbing member 530, and each of mutual interfaces between components thereof, most of the ultrasonic wave may be not transmitted, but reflected. Accordingly, a fingerprint recognition function of the fingerprint sensor 540 may deteriorate. Therefore, in an embodiment of the disclosure, components of each of the transparent member 510, the display panel 520, and the light absorbing member 530 may be configured not to have a great acoustic impedance difference with adjacent components. Hereinafter, embodiments relating to various configurations, in which components functioning as a medium of the ultrasonic wave generated by the fingerprint sensor 540 achieve the acoustic impedance matching, will be described.

FIGS. 6A to 6D are cross-sectional views illustrating examples of an arrangement structure of a fingerprint sensor included in an electronic device according to embodiments of the disclosure. FIGS. 6A to 6D may be transverse cross-sectional views of at least some region of the electronic device 101 of FIG. 4, the region including the fingerprint detection region 311.

Figure 6A:
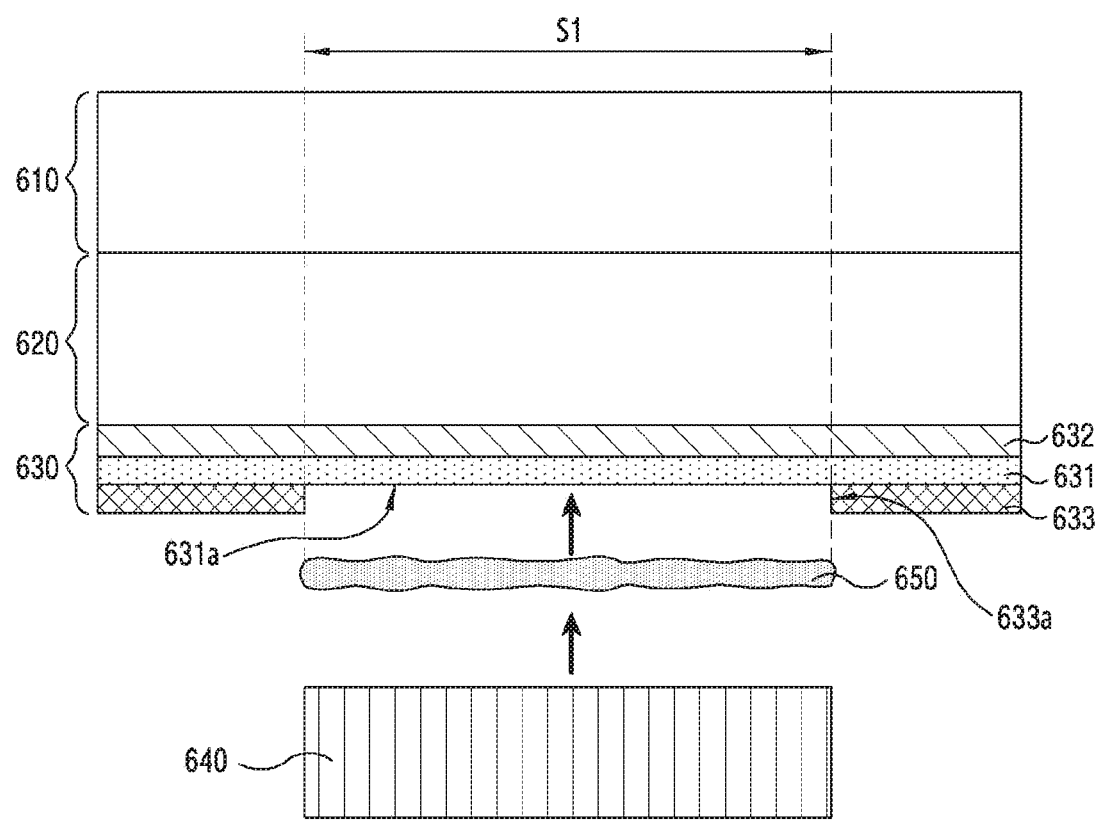
FIGS. 6A to 6D are cross-sectional views illustrating examples of an arrangement structure of a fingerprint sensor included in an electronic device according to embodiments of the disclosure.
Figure 6B:
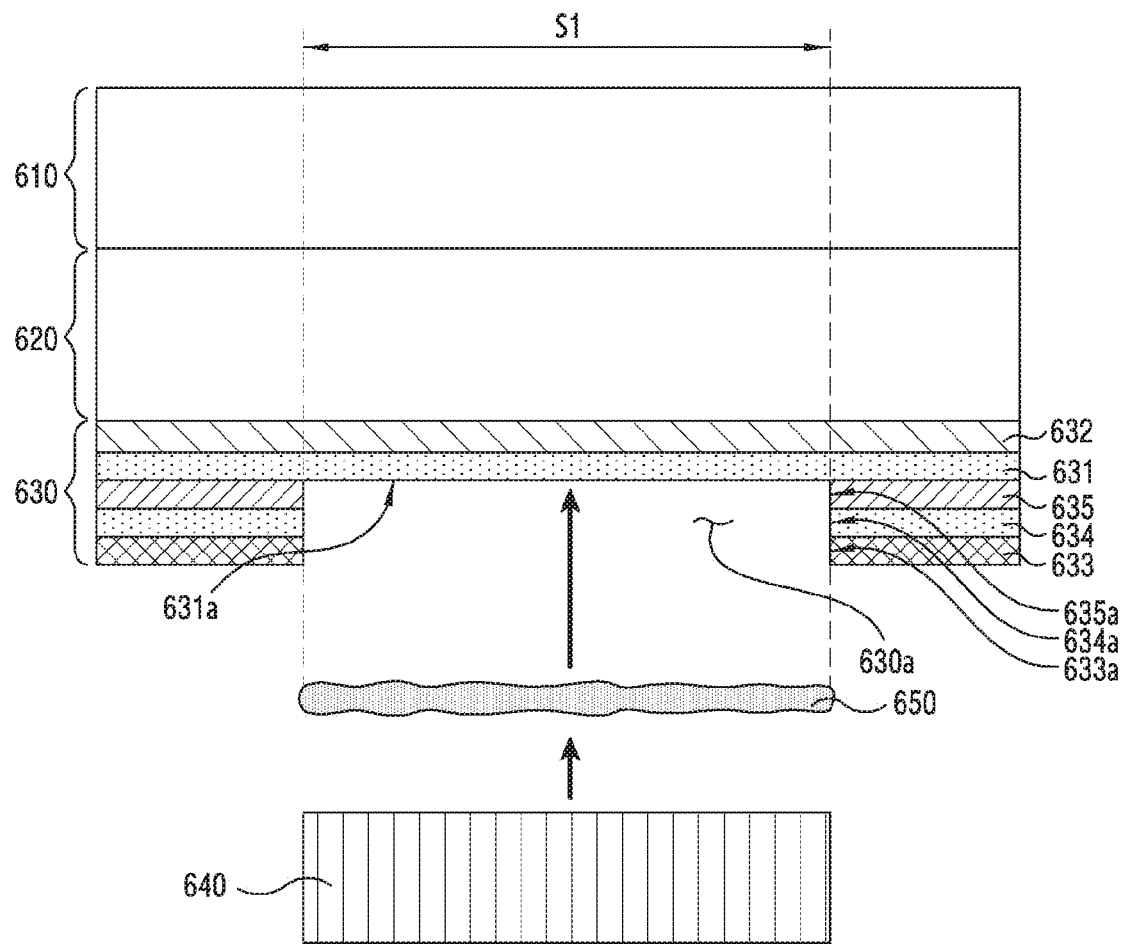
Figure 6C:
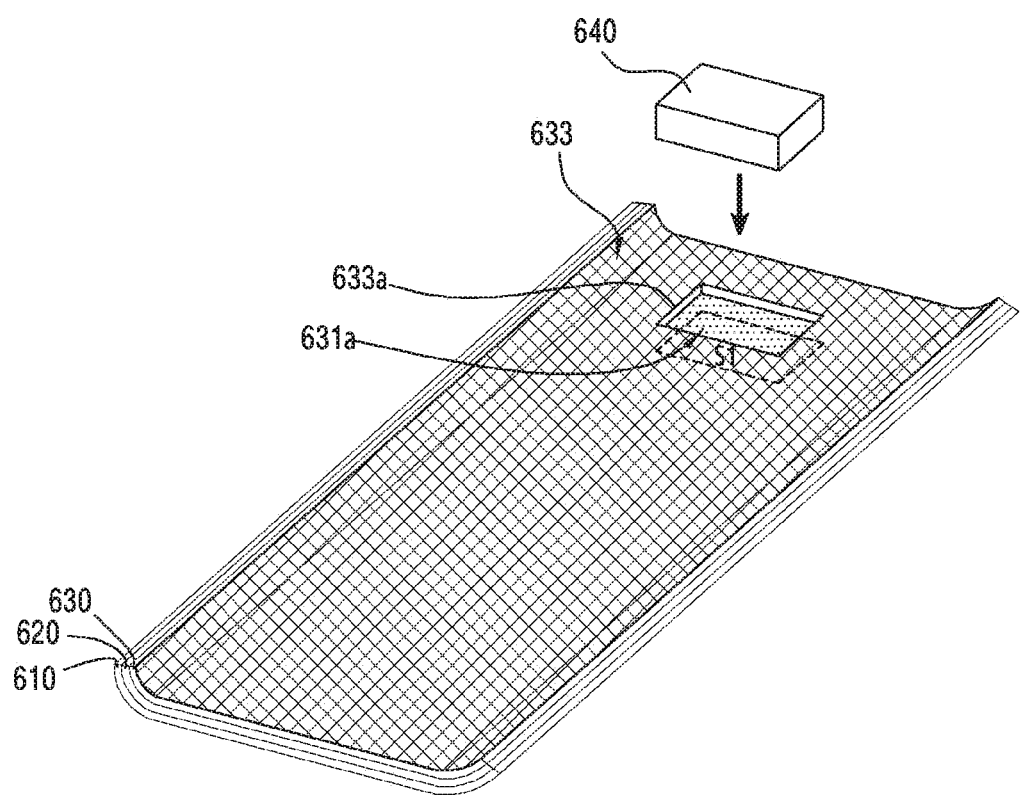

Referring to FIGS. 6A and 6C, a fingerprint sensor 640 (for example, the fingerprint sensor 540 of FIG. 5A) according to one embodiment may be disposed under a lamination in which a transparent member 610 (for example, the transparent member 510 of FIG. 5A), a display panel 620 (for example, the display panel 520 of FIG. 5A), and a light absorbing member 630 (for example, the light absorbing member 530 of FIG. 5A) are sequentially laminated. The light absorbing member 630 may include: a base layer 631 (for example, the base layer 531 of FIG. 5A); and a first adhesive layer 632 (or an upper adhesive layer, for example, the first adhesive layer 532 of FIG. 5A) and a second adhesive layer 633 (or a lower adhesive layer, for example, the second adhesive layer 533 of FIG. 5A) which are disposed on opposite surfaces of the base layer 631. The first adhesive layer 631 may prevent external visibility due to the photoelectric effect of a region to which the fingerprint sensor 640 is attached and minimize the damage to the display panel 620 so as to prevent external visibility of an attachment mark of the fingerprint sensor 640.

According to one embodiment, at least a part of the light absorbing member 630 may include an opening for receiving the fingerprint sensor 640. For example, the second adhesive layer 633 of the light absorbing member 630 may include an opening 633a. An area of the opening 633a may be larger than an area of the fingerprint sensor 640 so as to enable the fingerprint sensor 640 to be attached thereto. In a view from above, the opening 633a may have an area corresponding to a fingerprint detection region S1 (for example, 311 of FIG. 4) of the transparent member 610. In the light absorbing member 630, the base layer 631 may be exposed to the outside in a region 631a in which the opening 633a is formed. The light absorbing member 630 according to one embodiment may be manufactured according to a method in which, in a process of disposing the first adhesive layer 632 and the second adhesive layer 633 on the opposite surfaces of the base layer 631, the adhesive layers are disposed only in a region excluding the opening 633a. For example, the opening 633a may be formed by a process of disposing the first adhesive layer 632 and/or the second adhesive layer 633 on the base layer 631 after the masking treatment on the region 631a exposed to the outside.

An adhesive agent 650 may be used to bond the fingerprint sensor 640 to the exposed region 631a through the opening 633a. According to one embodiment, the liquid adhesive agent 650 may be applied to the exposed region 631a and an inner surface of the opening 633a. The fingerprint sensor 640 may be attached to the base layer 631 by means of the applied adhesive agent 650. The liquid adhesive agent 650 may be hardened and solidified after the fingerprint sensor 640 is positioned in a designated region. That is, the fingerprint sensor 640 may be fixedly attached to the base layer 631 by means of a liquid bonding method. In an embodiment, a process of removing bubbles in the liquid adhesive agent 650 may be added.

Referring to FIG. 6B, with reference to the arrangement structure of the fingerprint sensor 640 of FIG. 6A, the electronic device 101 may include an additional base 634 and an additional adhesive layer 635.

The fingerprint sensor 640 according to one embodiment may be disposed under a lamination in which the transparent member 610, the display panel 620, and the light absorbing member 630 are sequentially laminated. In the light absorbing member 630, the first adhesive layer 632, the base layer 631, and the second adhesive layer 633 may be sequentially disposed under the display panel 620. The light absorbing member 630 may further include a second base layer 634 and a third adhesive layer 635 between the second adhesive layer 633 and the base layer 631.

According to one embodiment, at least a part of the light absorbing member 630 may include an opening 630*a* for receiving the fingerprint sensor 640. For example, the second adhesive layer 633, the second base layer 634, and the third adhesive layer 635 of the light absorbing member 630 may include openings 633*a*, 634*a*, and 635*a*.

According to one embodiment, the opening 630*a* may be formed to have a size capable of receiving the fingerprint sensor 640 so as to enable the fingerprint sensor 640 to be mounted therein. In a view from the transparent member 610, the opening 630*a* may be formed to correspond to the fingerprint detection region of the transparent member 610.

According to another embodiment, the first base layer 631 may be exposed to the outside due to the formation of the opening 633*a*. The light absorbing member 630 may be formed by a process of laminating the third adhesive layer 635, the second base layer 634, and the second adhesive layer 633 on the first base layer 631 after the masking treatment on the region 631*a*, which is exposed to the outside, of the first base layer 631, and then removing the masking. According to an embodiment, the third adhesive layer 635, the second base layer 634, and the second adhesive layer 633, which include the openings 633*a*, 634*a*, and 635*a*, formed therethrough to correspond to the exposed region 631*a* of the first base layer 631, may be laminated on the first base layer 631.

According to one embodiment, a display panel may secure sufficient adhesive force and, a waterproof effect by means of the first adhesive layer 633 and the third adhesive layer 635. As a thickness of the first adhesive layer 633 is minimized, the fingerprint sensor 640 may have an improved detection performance. In order to secure waterproof and fingerprint detection performances, the first adhesive layer 633 and the third adhesive layer 635 may be formed to have suitable thicknesses.

According to one embodiment, at least some regions of the transparent member 610 and the display panel 620 may be curved. In order to secure a waterproof performance and adhesive force in a curved region, the third adhesive layer 635 may be formed to have a suitable thickness. In a flat region, the first adhesive layer 633 may be formed to have a suitable thickness in order to secure a performance of a fingerprint sensor.

As a thickness of the light absorbing member 630 may be formed to be different in each of a region corresponding to the ultrasonic sensor 640 and a remaining region, the light absorbing member 630 may be formed to be suitable for a function of each of the regions.

The adhesive agent 650 may be used to bond the fingerprint sensor 640 to the exposed region 631*a* through the openings 633*a*, 634*a*, and 635*a*. According to one embodiment, the liquid adhesive agent 650 may be applied to the exposed region 631*a* and an inner surface of the opening 633*a*. The fingerprint sensor 640 may be attached to the base layer 631 by means of the applied adhesive agent 650. The liquid adhesive agent 650 may be hardened and solidified after the fingerprint sensor 640 is positioned in a designated region. That is, the fingerprint sensor 640 may be fixedly attached to the base layer 631 by means of a liquid bonding method. In an embodiment, a process of removing bubbles in the liquid adhesive agent 650 may be added.

Figure 6D:
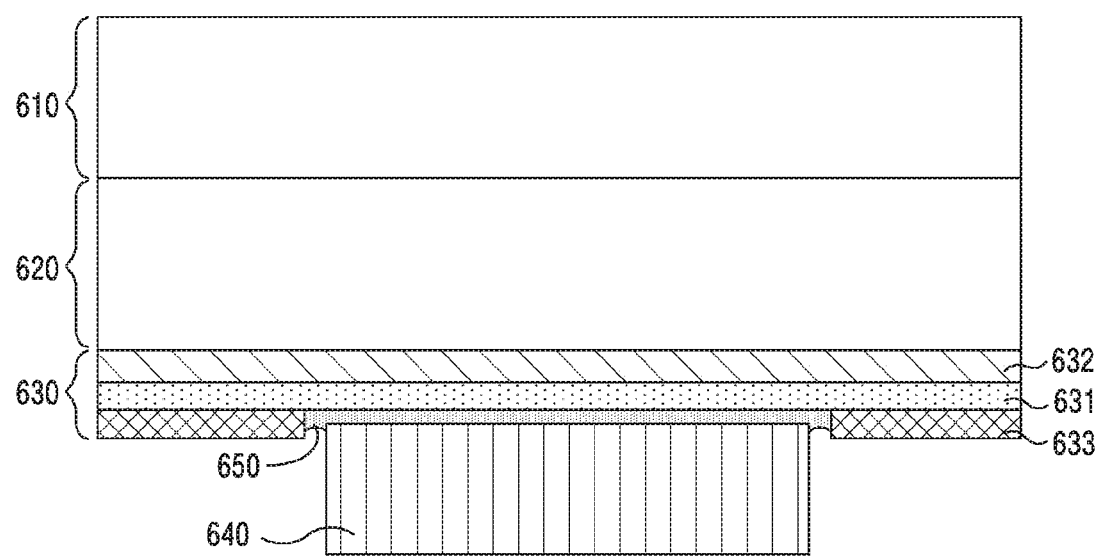

FIG. 6D is a cross-sectional view of a state where the fingerprint sensor 640 according to embodiments of the disclosure may be attached under the transparent member 610, the display panel 620, and the light absorbing member 630. As described above, the impedance matching between media of an ultrasonic wave may be important in order to improve a fingerprint recognition rate of the fingerprint sensor 640. The acoustic impedance may be mathematically proportional to the density and sound velocity of a medium. In addition, the sound velocity may be proportional to a square root of the bulk modulus of the medium, and the bulk modulus of a solid may indicate the Young's modulus (or the elastic modulus). That is, elastic moduli of media may be a major factor in the impedance matching.

According to one embodiment, the base layer 631 of the light absorbing member 630 may be made of a polymer material. The elastic modulus of the polymer material may be approximately 2 to 3 GPa. The first adhesive layer 632 and the second adhesive layer 633 may be made of an acrylic material, and the elastic modulus of the acrylic material may be approximately 0.1 MPa, and it is thus noted that the transmission rate of ultrasonic waves may be lowered due to the impedance mismatching between media made of the polymer material and the acrylic material. Therefore, the fingerprint sensor 640 according to an embodiment of the disclosure may be fixedly attached to the base layer 631 while being in close contact with the same, by using the adhesive agent 650, not the second adhesive layer 633. According to one embodiment, the adhesive agent 650 may be made of an epoxy material. The elastic modulus of the epoxy material may be approximately 2 GPa. That is, the impedance matching is possible between the adhesive agent 650 made of the epoxy material and the base layer 631 made of the polymer material. Therefore, the fingerprint sensor 640 according to one embodiment may be fixedly attached to the base layer 631 by means of the separate adhesive agent 650, not the second adhesive layer 633, and thus have an improved fingerprint recognition performance.

FIGS. 7A to 7D are cross-sectional views illustrating examples of a light absorbing member of an electronic device according to embodiments of the disclosure. A transparent member 710 (for example, the transparent member 610 of FIGS. 6A to 6D), a display panel 720 (for example, the display panel 620 of FIGS. 6A to 6D), a fingerprint sensor 740 (the fingerprint sensor 640 of FIGS. 6A to 6D), and an adhesive agent 750 (for example, the adhesive agent 650 of FIGS. 6A to 6D), which are illustrated in FIGS. 7A to 7D, may be at least partially equal or similar to the components described in FIGS. 6A to 6D, and overlapping descriptions thereof are omitted. In addition, embodiments described in FIGS. 7A to 7D are described in the embodiments of FIGS. 6A to 6D, but it is natural that the addition of a configuration not shown in FIGS. 7A to 7D is not limited.

Figure 7A:
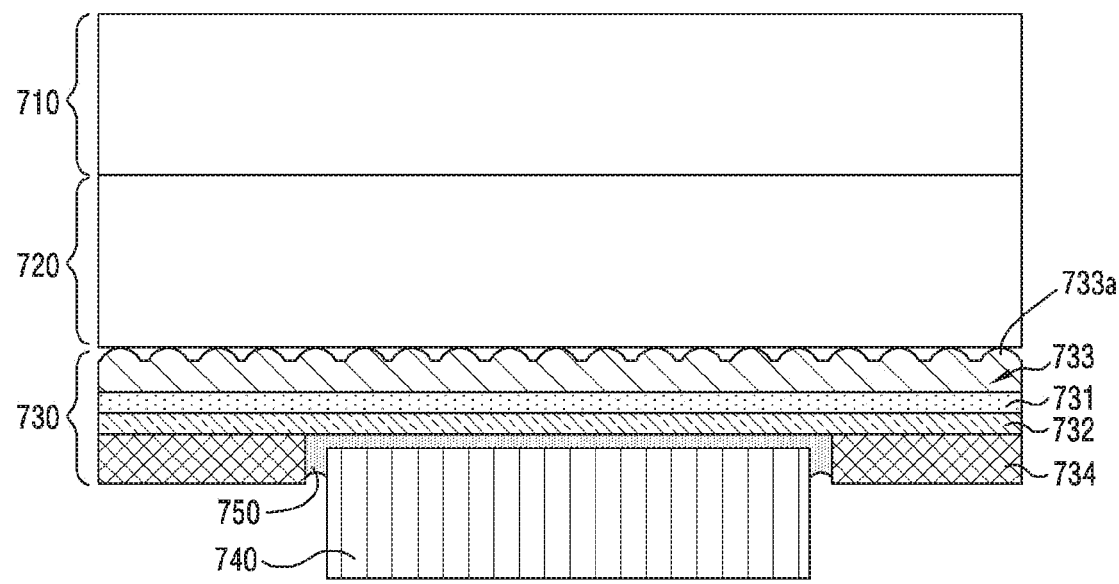
FIGS. 7A to 7E are cross-sectional views illustrating various examples of a light absorbing member of an electronic device according to embodiments of the disclosure.

Referring to FIG. 7A, the light absorbing member 730 according to one embodiment may include a base layer 731, a black coated layer 732, a first adhesive layer 733, and a second adhesive layer 734. According to one embodiment, the black coated layer 732 may be disposed on the base layer 731. For example, as illustrated, the black coated layer 732 may be disposed under the base layer 731. In an embodiment, the black coated layer 732 may be disposed on the base layer 731. The black coated layer 732 may absorb at least a part of external light incident into the fingerprint sensor 740 through the transparent member 710 and the display panel 720. When a user looks at the transparent member 710, the black coated layer 732 enables an inner part (for example, the fingerprint sensor 740) of an electronic device to be invisible through the transparent member 710 and the display panel 720 which becomes transparent when the display panel does not operate.

According to one embodiment, the first adhesive layer 733 of the light absorbing member 730 may include an embossed pattern 733a formed on the first adhesive layer 733 in order to minimize or remove bubbles which may be formed on an adhesion surface with the display panel 720. The first base layer 732 may be made of a polymer material (for example, PET) in order to maintain a shape of the first adhesive layer 733. The embossed pattern 733a may include a dot pattern, a stripe pattern, a grid pattern, and the like. The first adhesive layer 733 including the embossed pattern 733a may be referred to as a formed adhesive layer, and the entire of the light absorbing member 730 may be referred to as an embossed layer.

Figure 7B:
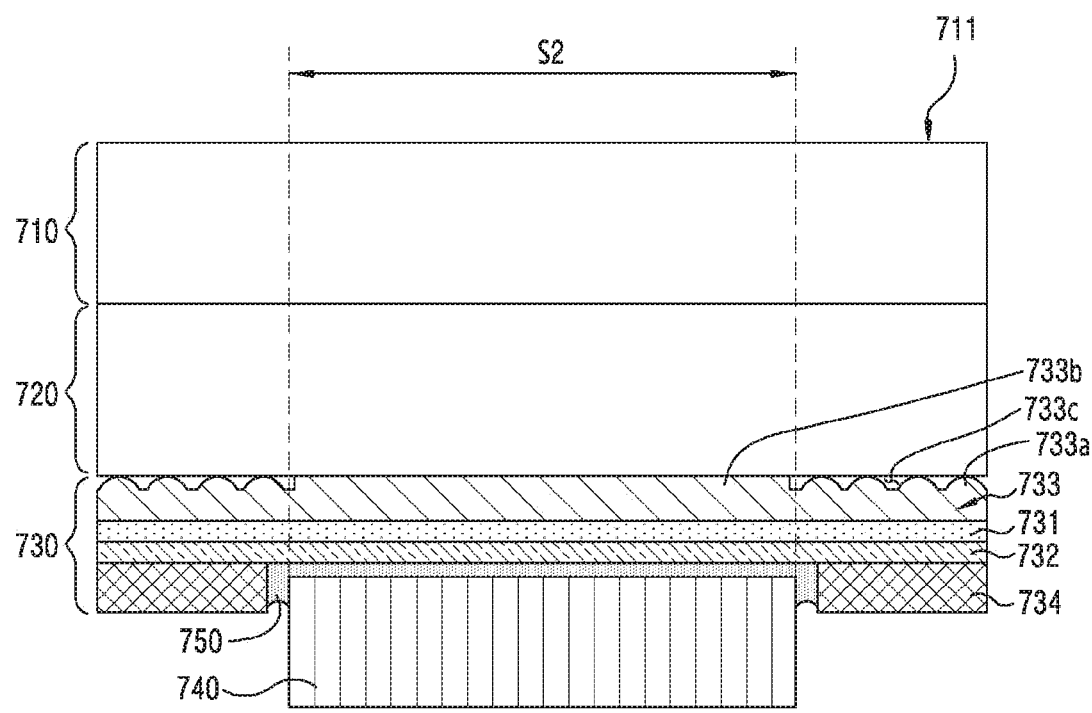

Referring to FIG. 7B, in a view from above, the first adhesive layer 733 of the light absorbing member 730 according to one embodiment may include a flat portion 733b at a position corresponding to a fingerprint detection region S2 (for example, 311 of FIG. 4). In a view from above, the flat portion 733b may be formed at a position corresponding to the fingerprint sensor 740. The flat portion 733b may be formed on a transmitting path of at least one ultrasonic wave generated and received by the fingerprint sensor 740, the transmitting path being between the fingerprint sensor 740 and an exposed surface 711 of the transparent member 710. An adhesion surface between the first adhesive layer 733 and the display panel 720 may contain air due to at least one space 733c formed between protrusions of the embossed pattern 733c. An ultrasonic wave may have the great energy loss when a phase of a medium is changed (for example, a phase change from a solid to a gas). For example, the acoustic impedance of air has a very small value of approximately 0.004 p/uS. The air contained in the space 733c of the first adhesive layer 733 may incur the serious acoustic impedance mismatching. The flat portion 733b according to one embodiment enables the first adhesive layer 733 to be attached to the display panel 720 while being in close contact with the same, so as to prevent the formation of bubbles between the first adhesive layer 733 and the display panel 720 in the fingerprint detection region S2. The flat portion 733b may function to enable an ultrasonic wave to be transmitted without the great energy dissipation between the fingerprint sensor 740 and the transparent member 710. Therefore, the flat portion 733b may contribute to the performance improvement in the fingerprint recognition function of the fingerprint sensor 740.

Figure 7C:
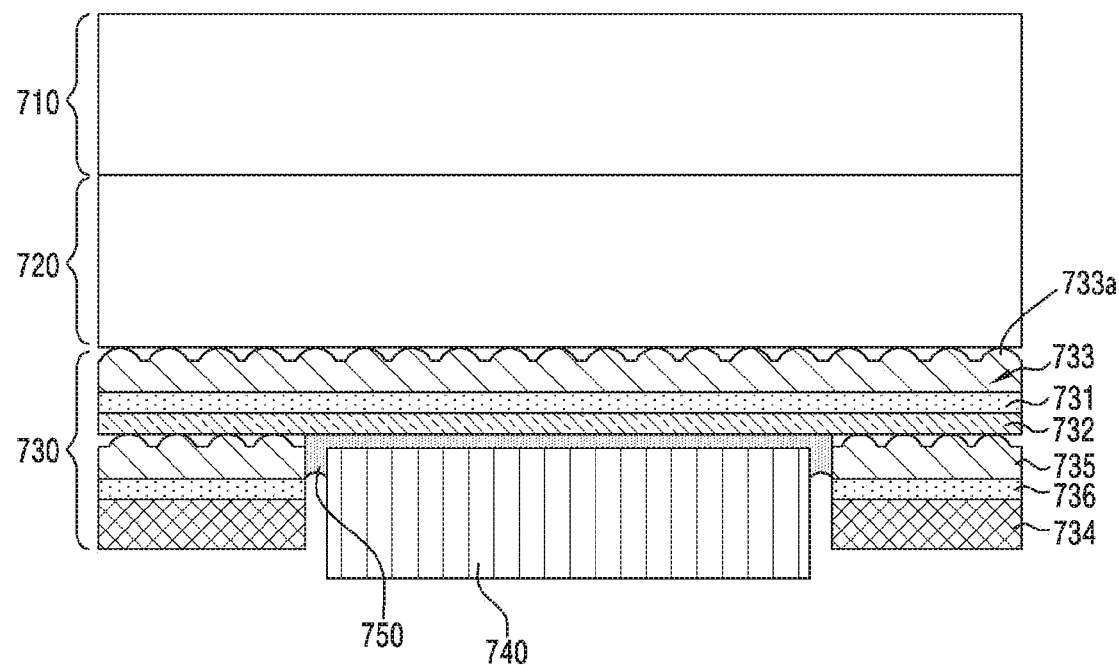
Figure 7D:
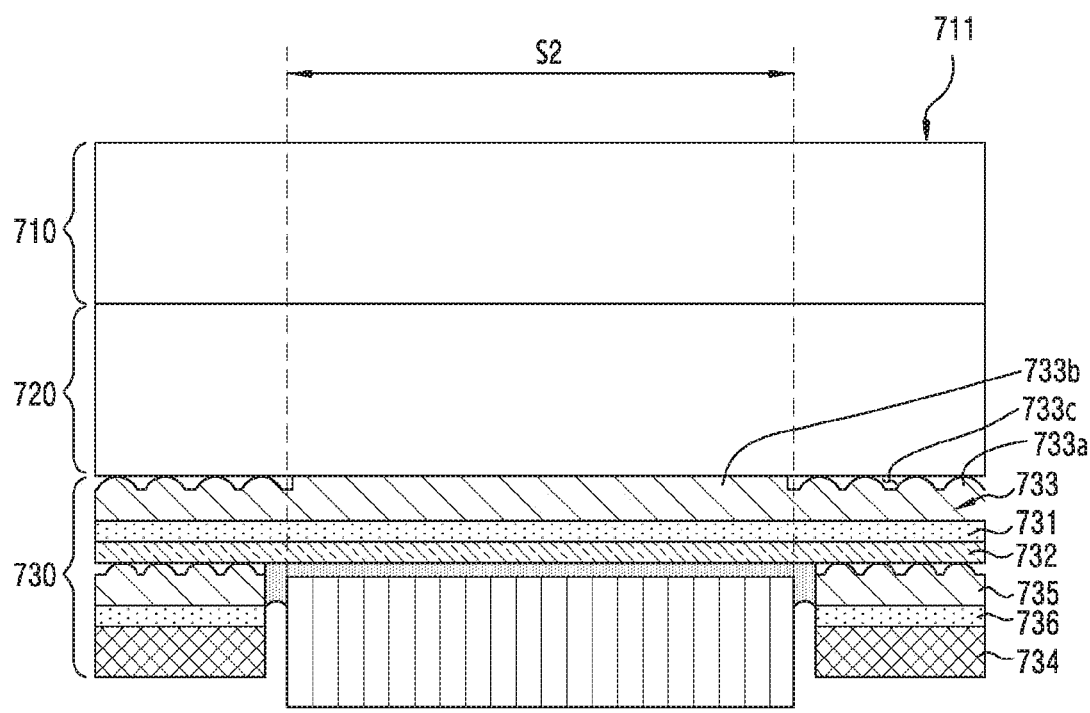
Figure 7E:
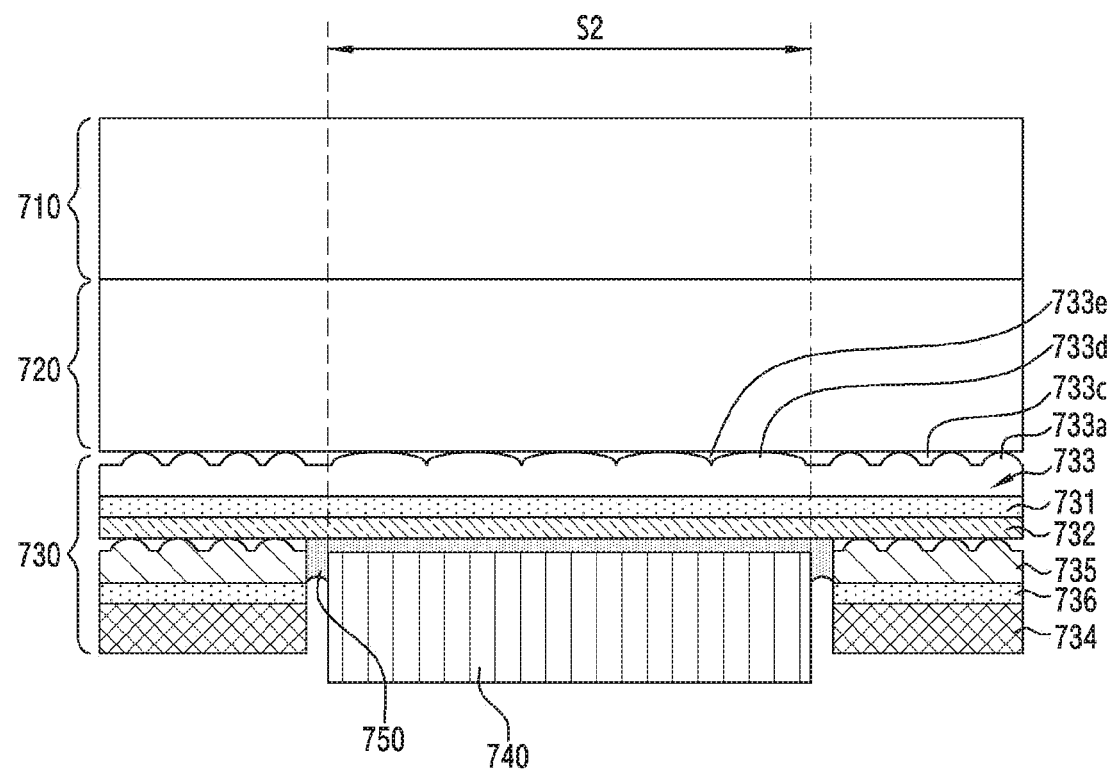

Referring to FIGS. 7C to 7E, as shown in FIG. 7A, the light absorbing member 730 according to one embodiment may include the first adhesive layer 733, the first base layer 731, the black coated layer 732, and the second adhesive layer 734, and may further include a third adhesive layer 735 and a second base layer 736 between the second adhesive layer 734 and the black coated layer 732.

The third adhesive layer 735 may include an embossed pattern formed on the third adhesive layer 735 in order to minimize or remove bubbles which may be formed on an adhesion surface with the first base layer 731. The third adhesive layer 735 including the embossed pattern may be attached to the first base layer 731 while being in close contact with the same, and may thus improve a waterproof performance of a lateral side of the display panel 720 and increase the adhesive force.

According to one embodiment, the first base layer 813 and the second base layer 736 may be made of a polymer material (for example, PET) in order to maintain embossed shapes of the first adhesive layer 733 and the third adhesive layer 735.

According to one embodiment, the first, second, and third adhesive layers 733, 734, and 735 may be configured to have various thicknesses. The first adhesive layer 733 may be manufactured to have a thin thickness for a performance of the fingerprint sensor 740, and the third adhesive layer 735 may be manufactured to have a thick thickness in order to secure a waterproof performance of an electronic device and the adhesive force of the display panel 720. The first, second, and third adhesive layers 733, 734, and 735 may be formed to have suitable thicknesses in light of the adhesive force, a waterproof performance, and a performance of the fingerprint sensor 740.

Referring to FIG. 7D, as shown in FIG. 7B, the fingerprint detection region S2 may include the flat portion 733b and a remaining region may include the embossed pattern 733c. The flat portion 733b may be formed on an ultrasonic wave transmitting path between the ultrasonic fingerprint sensor 740 and the exposed surface 711 of the transparent member 710. An adhesion surface between the first adhesive layer 733 and the display panel 720 may contain air due to at least one space 733c formed between protrusions of the embossed pattern 733c.

The flat portion 733b according to one embodiment enables the first adhesive layer 733 to be attached to the display panel 720 while being in close contact with the same, so as to prevent the formation of bubbles between the first adhesive layer 733 and the display panel 720 in the fingerprint detection region S2. The flat portion 733b may function to enable an ultrasonic wave to be transmitted without the great energy dissipation between the fingerprint sensor 740 and the transparent member 710. Therefore, the flat portion 733b may contribute to the performance improvement in the fingerprint recognition function of the fingerprint sensor 740.

According to one embodiment, the transparent member 710 and the display panel 720 may have edge shapes whose edge has the curvature. A thickness of the third adhesive layer 735 in each of edge regions of the transparent member 710 and the display panel 720 may be suitably formed to secure a waterproof performance in order to protect the display panel 720.

Referring to FIG. 7E, according to one embodiment, various structures of the embossed pattern 733a may be formed unlike the light absorbing member 730 of FIG. 7C. According to one embodiment, an embossed pattern 733d in the fingerprint detection region S2 may be different from the embossed pattern 733a of a remaining region. A width of the embossed pattern 733d disposed in the fingerprint detection region S2 may be formed to be wide, and a width of an embossed pattern groove 733e may be formed to be narrow. The width of the embossed pattern 733d in the fingerprint detection region S2 may be formed to be wide, and the adhesive layer 733 in the fingerprint detection region S2 may thus contain less bubbles. A height of the groove 733e and a width of the groove 733e may be formed to be small, and a space containing air may be thus formed to be small and contain less bubbles.

According to various embodiments, in order to guarantee the performance of the fingerprint sensor 740, the embossed pattern 733d and the groove 733e of the first adhesive layer 733 in the fingerprint detection region S2 may be variously formed to minimize bubbles contained in the first adhesive layer 733 in the fingerprint detection region S2.

Figure 8A:
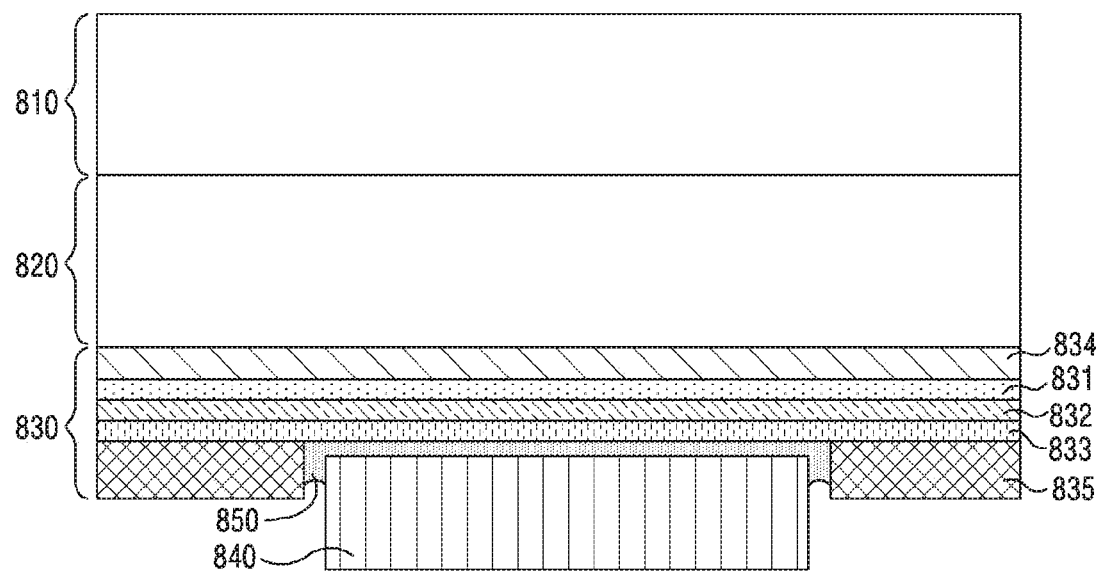
FIGS. 8A to 8D are cross-sectional views illustrating other examples of a light absorbing member of an electronic device according to embodiments of the disclosure.
Figure 8B:
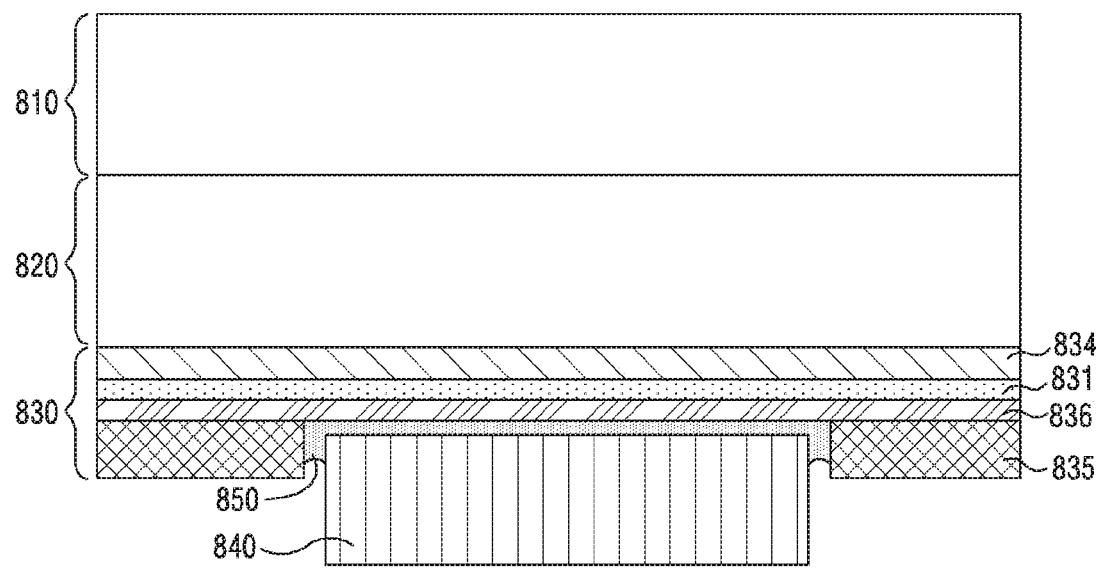
Figure 8C:
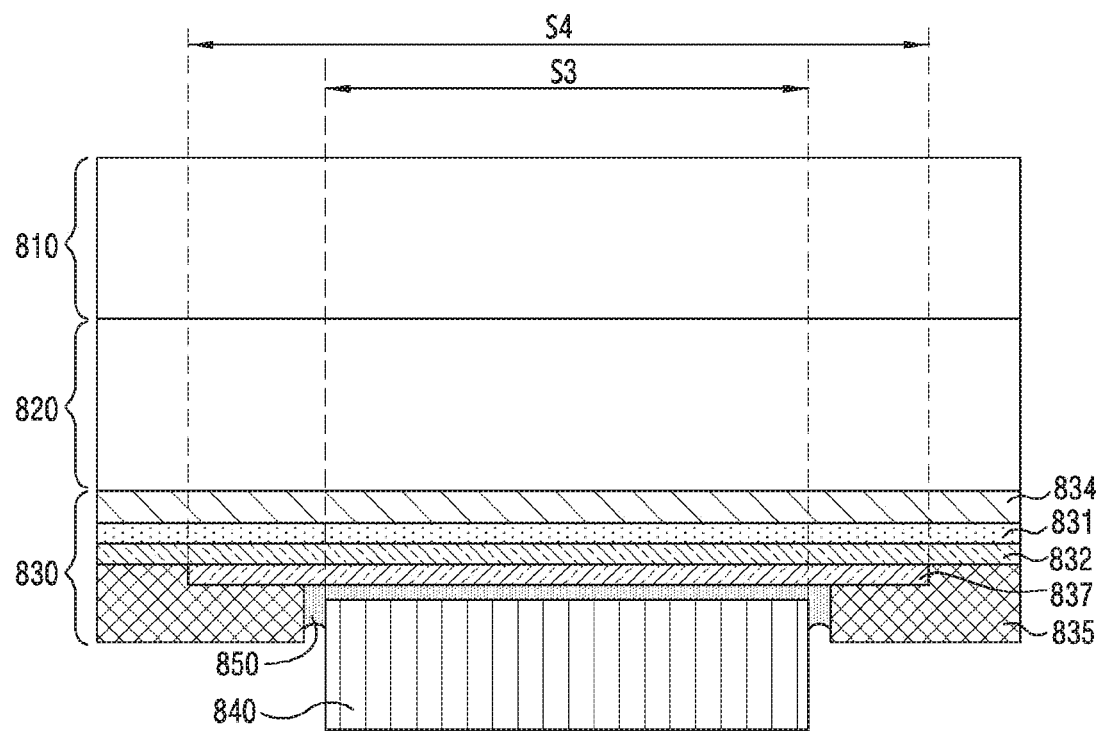
Figure 8D:
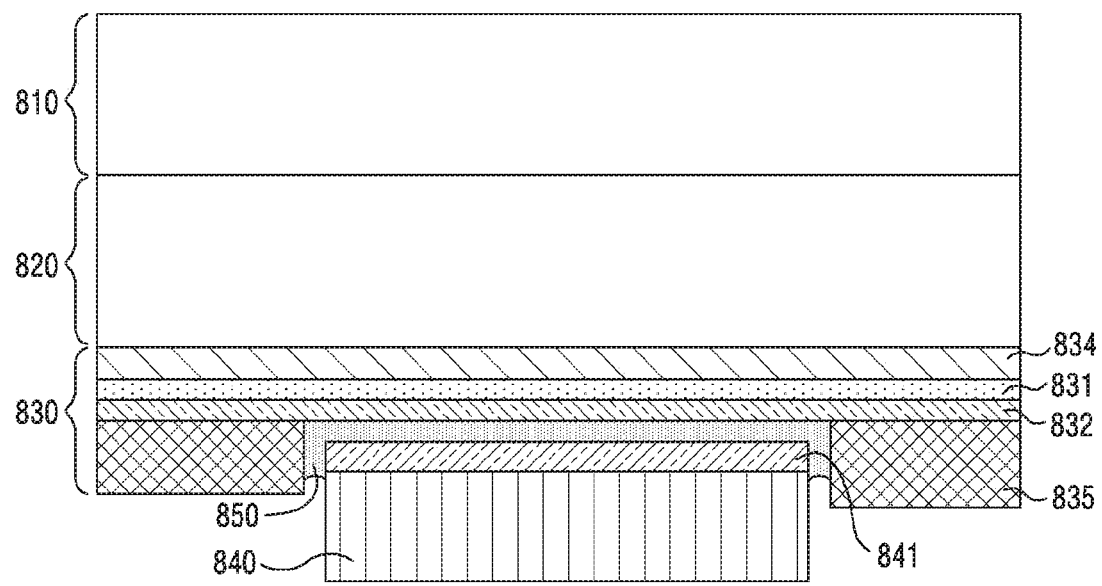

FIGS. 8A to 8D are cross-sectional views illustrating other examples of a light absorbing member of an electronic device according to embodiments of the disclosure. A transparent member 810 (for example, the transparent member 710 of FIGS. 7A to 7E), a display panel 820 (for example, the display panel 720 of FIGS. 7A to 7E), a fingerprint sensor 840 (for example, the fingerprint sensor 740 of FIGS. 7A to 7E), and an adhesive agent 850 (for example, the adhesive agent 750 of FIGS. 7A to 7E), which are illustrated in FIGS. 8A to 8D, may be at least partially equal or similar to the components described in FIGS. 6A to 7B, and overlapping descriptions thereof are omitted. In addition, embodiments described in FIGS. 8A and 8D are described in the embodiments of FIGS. 6A to 7B, but it is natural that the addition of a configuration not shown in FIGS. 8A and 8B is not limited.

Referring to FIG. 8A, a light absorbing member 830 according to one embodiment may include a base layer 831, a black coated layer 832, a noise shielding layer 833, a first adhesive layer 834, and a second adhesive layer 835. The noise shielding layer 833 may shield noise which may occur at the display panel 820 and the like, and thus improve the electro-magnetic compatibility (EMC) of the fingerprint sensor 840. According to one embodiment, the noise shielding layer 833 may be disposed on the black coated layer 832. The noise shielding layer 833 may be formed according to a film transfer method, printing, or a printing method. For example, as illustrated, the noise shielding layer 833 may be disposed under the black coated layer 832. In an embodiment, the noise shielding layer 833 may be disposed on the base layer 831. In another embodiment, the noise shielding layer 833 may be interposed between the base layer 831 and the black coated layer 832. Embodiments are not limited thereto, and with reference to the base layer 831, the black coated layer 832 and the noise shielding layer 833 may have various laminating orders or arrangement relations therebetween.

Referring to FIG. 8B, a light absorbing member 830 according to one embodiment may include: a base layer 831; a conductive black coated layer 836 disposed on the base layer 831; and a first adhesive layer 834 and a second adhesive layer 835 which are disposed on one surface of the base layer 831 and one surface of the conductive black coated layer 836, respectively. The conductive black coated layer 836 may be made of a conductive ink. The conductive black coated layer 836 enables internal parts (for example, 101 of FIG. 4) of an electronic device including the fingerprint sensor 840 to be invisible, and may also have a shielding function.

Referring to FIG. 8C, a light absorbing member 830 according to one embodiment may include a base layer 831, a black coated layer 832, a noise shielding member 837, a first adhesive layer 834, and a second adhesive layer 835. The noise shielding member 837 may shield noise which may occur at a display panel 820 and the like, and thus improve the electro-magnetic compatibility (EMC) of the fingerprint sensor 840. According to one embodiment, the noise shielding member 837 may be attached on the black coated layer 832. For example, as illustrated, the noise shielding member 837 may be attached under the black coated layer 832. In a view from above, the noise shielding member 837 may be attached to a position corresponding to the fingerprint sensor 840. For example, in a view from above, the noise shielding member 837 may be disposed on the black coated layer 832 at a position corresponding to a fingerprint detection region S3 (for example, 311 of FIG. 4). According to one embodiment, the noise shielding member 837 may have an area correspond to the fingerprint detection region S3 of a transparent member 810 or may have an area S4 larger than the same. In a view from above, the noise shielding member 837 may have the area S4 capable of completely covering the fingerprint sensor 840 and thus improve the electro-magnetic compatibility.

Referring to FIG. 8D, a fingerprint sensor 840 according to one embodiment may include a noise shielding portion 841. The noise shielding portion 841 may be disposed at the outermost side in which the fingerprint sensor 840 faces a display panel 820. The fingerprint sensor 840 including the noise shielding portion 841 may be attached to a lamination of a transparent member 810, the display panel 820, and a light absorbing member 830. For example, as illustrated, the noise shielding portion 841 may be fixedly attached to a black coated layer 832 disposed on a base layer 831 by using an adhesive agent 850. Embodiments are not limited thereto, and the fingerprint sensor 840 including the noise shielding portion 841 may be attached to a lamination in accordance with any suitable method. An embodiment, in which the fingerprint sensor 840 includes a noise shielding member, will be concretely described in FIGS. 10 and 12E to 12J.

Figure 9A:
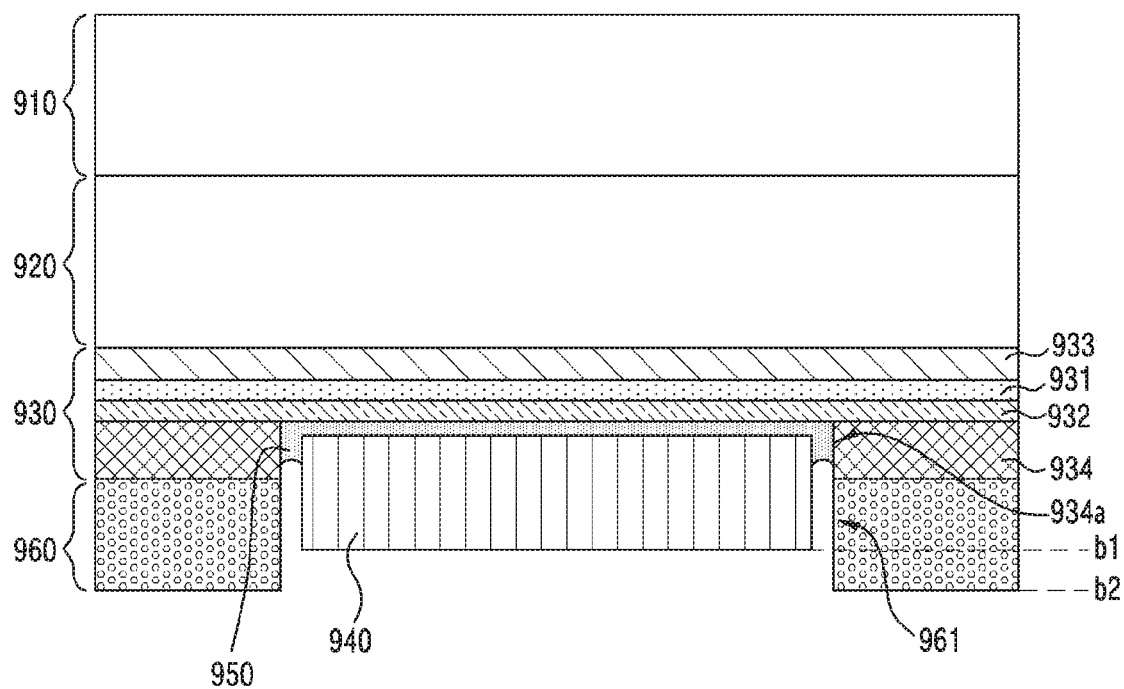
FIGS. 9A and 9B are cross-sectional views illustrating other examples of an arrangement structure of a fingerprint sensor in an electronic device according to embodiments of the disclosure.
Figure 9B:
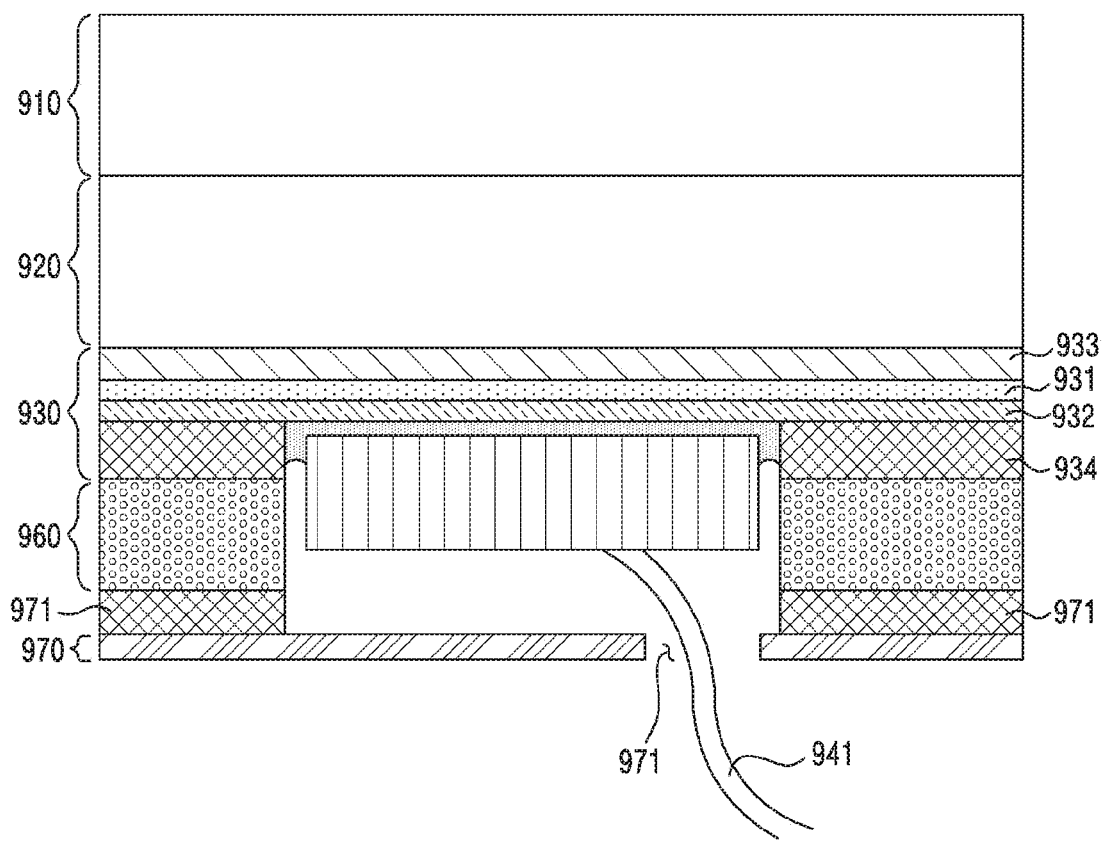

FIGS. 9A and 9B are cross-sectional views illustrating other examples of an arrangement structure of a fingerprint sensor in an electronic device according to embodiments of the disclosure. A transparent member 910 (for example, the transparent member 810 of FIGS. 8A to 8D), a display panel 920 (for example, the display panel 820 of FIGS. 3A to 8D), a light absorbing member 930 (for example, the light absorbing member 830 of FIGS. 8A to 8D), a fingerprint sensor 940 (for example, the fingerprint sensor 840 of FIGS. 8A to 8D), and an adhesive agent 950 (for example, the adhesive agent 850 of FIGS. 8A to 8D), which are illustrated in FIGS. 9A to 9B, may be at least partially equal or similar to the components described in FIGS. 6A to 8D, and overlapping descriptions thereof are omitted. In addition, embodiments described in FIGS. 9A and 9B are described in the embodiments of FIGS. 6A to 8D, but may further include a configuration not illustrated in FIGS. 9A and 9B.

Referring to FIG. 9A, an electronic device (for example, 101 of FIG. 4) according to one embodiment may include a buffer member 960 (or a cushion layer) attached to a lamination of a transparent member 910, a display panel 920, and a light absorbing member 930. The buffer member 960 may be attached to the light absorbing member 930 by means of the adhesive force of a second adhesive layer 934. In order to absorb or mitigate external impact applied to the transparent member 910, the buffer member 960 may be made of an elastic material which is compressed while being pressed and is recovered to an original shape while being released. The buffer member 960 may include multiple air holes to prepare for compression which is caused when the buffer member is pressed. The air holes included in the buffer member 960 may cause the energy loss due to the acoustic impedance mismatching between the air (gas) contained in the air holes and the buffer member (solid), and diffused reflection of ultrasonic waves due to an irregular shape or arrangement of the air holes. That is, it may not be desirable to position the buffer member 960 on an ultrasonic wave transmitting path. The buffer member 960 may not be disposed between a fingerprint sensor 940 (or a detector (for example, an ultrasonic wave oscillator and/or an ultrasonic wave receiver) of the fingerprint sensor 940) and a fingerprint detection region (for example, 311 of FIG. 3A). According to one embodiment, the buffer member 960 may include an opening 961 for receiving the fingerprint sensor 940. The opening 961 of the buffer member 960 may have an area at least partially corresponding to the second adhesive layer 934 of the light absorbing member 930.

According to one embodiment, the buffer member 960 may be designed to have a lowest surface b2 which is lower than or level with a lowest surface (or a baseline) b1 of the fingerprint sensor 940. In a view from the side, the fingerprint sensor 940 may not protrude to the outside beyond the buffer member 960. In other words, when viewed upside down, the buffer member 960 may be formed to be higher than the fingerprint sensor 940. Accordingly, the buffer member 960 may prevent the fingerprint sensor 940 from being damaged due to not only the external impact applied to the transparent member 910 but also the impact which may be caused below.

Referring to FIG. 9B, an electronic device (for example, 101 of FIG. 4) according to one embodiment may include a buffer member 960 and a heat-radiating plate 970, which are attached to a lamination of a transparent member 910, a display panel 920, and a light absorbing member 930. The heat-radiating plate 970 may be attached under the buffer member 960. An adhesive layer 971 may be interposed between the heat-radiating plate 970 and the buffer member 960 to enable the same to be attached to each other. The heat-radiating plate 970 may block heat generated from other electronic parts included in the electronic device. For example, a main processor, a graphic processing unit, a communication processor, and a battery (for example, 360 of FIG. 4) which are mounted on a printed circuit board (for example, 350 of FIG. 4) of an electronic device may generate a large amount of heat when being driven as a main heat source of the electronic device. The heat-radiating plate 970 may block heat transmission from these electronic parts and thus prevent the degradation in performances of the display panel 920 and the fingerprint sensor 940.

According to one embodiment, in a view from above, the heat-radiating plate 970 may be designed to cover at least a part of the fingerprint sensor 940. The heat-radiating plate 970 may include a slit 972 through which a flexible printed circuit board (FPCB) 941 is withdrawn, and the FPCB transfers power and/or a signal of the fingerprint sensor 940 to at least one processor. The slit 972 may have a length which is equal to or longer than a width of the FPCB 941.

Figure 10:
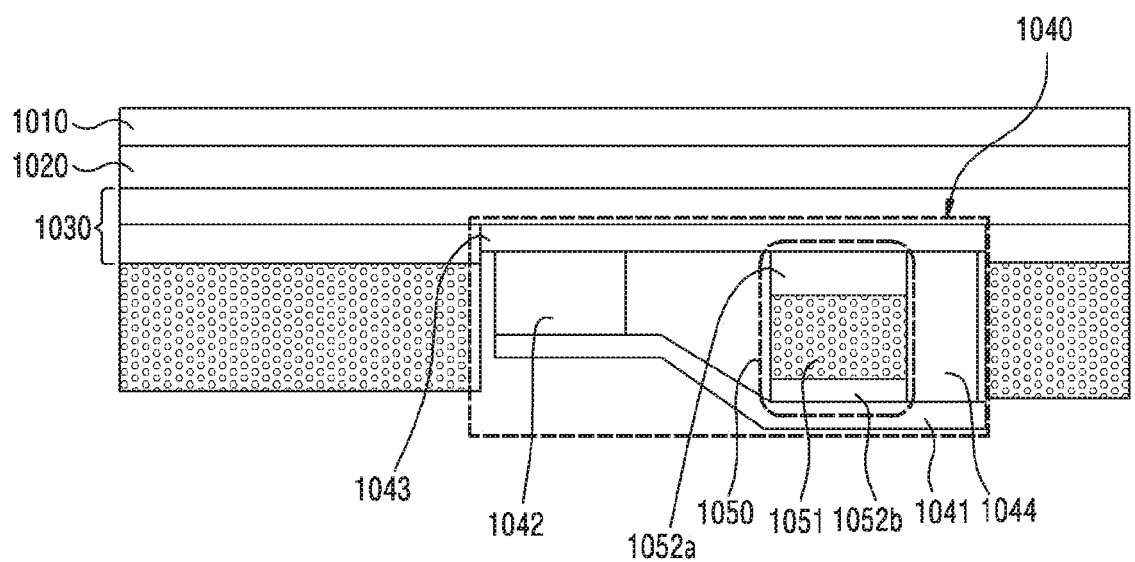
FIG. 10 is a cross-sectional view illustrating an example of a structure of a fingerprint sensor in an electronic device according to embodiments of the disclosure.

FIG. 10 is a cross-sectional view illustrating an example of a structure of a fingerprint sensor in an electronic device according to embodiments of the disclosure. A transparent member 1010 (for example, the transparent member 910 of FIGS. 9A and 9B), a display panel 1020 (for example, the display panel 920 of FIGS. 9A and 9B), a light absorbing member 1030 (for example, the light absorbing member 930 of FIGS. 9A and 9B), and an adhesive agent 1050 (for example, the adhesive agent 950 of FIGS. 9A and 9B), which are illustrated in FIG. 10, may be at least partially equal or similar to the components described in FIGS. 6A to 9B, and overlapping descriptions thereof are omitted. In addition, an embodiment described in FIG. 10 is described in the embodiments of FIGS. 6A to 9B, but may further include a configuration not illustrated in FIG. 10.

Referring to FIG. 10, a fingerprint sensor 1040 according to one embodiment may further include an impact preventing portion 1050. The fingerprint sensor 1040 may include a detector 1042 disposed on a printed circuit board 1041, a noise shielding layer 1043 for shielding noise affecting the detector 1042, and a conductive member 1044 for connecting the noise shielding layer 1043 to an earthing portion of the printed circuit board 1041. The detector 1042 may include an ultrasonic wave receiver and/or an ultrasonic wave oscillator. According to one embodiment, the buffer portion 1050 may be disposed between the detector 1042 and the conductive member 1044. The buffer member 1050 may include: an impact preventing member 1051 including multiple air holes for compression and recovery; a first adhesive layer 1052a; and a second adhesive layer 1052b. The first adhesive layer 1052a and the second adhesive layer 1052b may attach the impact preventing member 1051 to the noise shielding layer 1043 and the printed circuit board 1041, respectively. As the fingerprint sensor 1040 includes the buffer portion 1050, the fingerprint sensor 1040 and the detector 1042 may be prevented from being damaged due to not only the external impact at the top (for example, the transparent member 1010) but also the impact which may be caused below. According to one embodiment, the buffer portion 1050 may have a height higher than a height of the detector 1042, and the impact caused below may be thus prevented from being directly applied to the detector 1042. In an embodiment, the first adhesive layer 1052a and the second adhesive layer 1052b may be used as adhesive members for fixing the conductive member 1044 between the noise shielding layer 1043 and the earthing portion of the printed circuit board 1041. The first adhesive layer 1052a and the second adhesive layer 1052b may include a conductive tape so as to be electrically connected to the noise shielding layer 1043.

FIGS. 11A to 11D illustrate other examples of an arrangement structure of a fingerprint sensor in an electronic device according to embodiments of the disclosure. A transparent member 1110 (for example, the transparent member 1010 of FIG. 10), a display panel 1120 (for example, the display panel 1020 of FIG. 10), a fingerprint sensor 1170 (for example, the fingerprint sensor 1040 of FIG. 10), and an adhesive agent 1150 (for example, the adhesive agent 1050 of FIG. 10), which are illustrated in FIGS. 11A to 11D, may be at least partially equal or similar to the components described in FIGS. 6A to 10, and overlapping descriptions thereof are omitted. In addition, embodiments described in FIGS. 11A to 11D are described in the embodiments of FIGS. 6A to 10, but may further include a configuration not illustrated in FIGS. 11A to 11D.

Figure 11A:
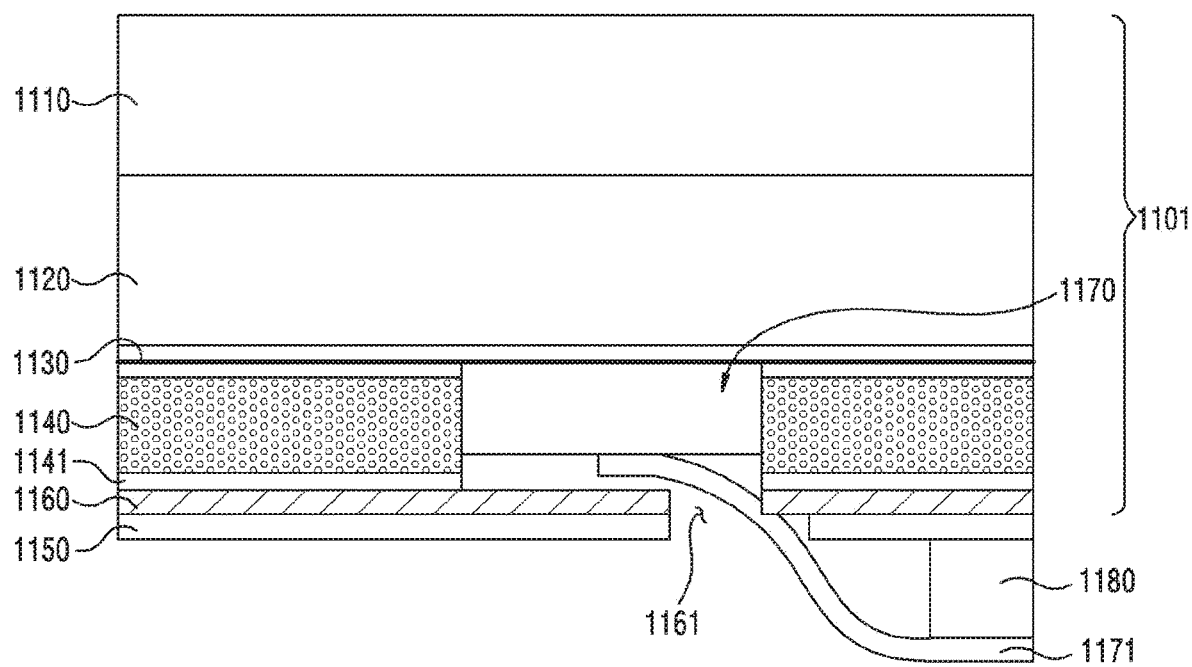
FIGS. 11A and 11B illustrate other examples of an arrangement structure of a fingerprint sensor in an electronic device according to embodiments of the disclosure.
Figure 11B:
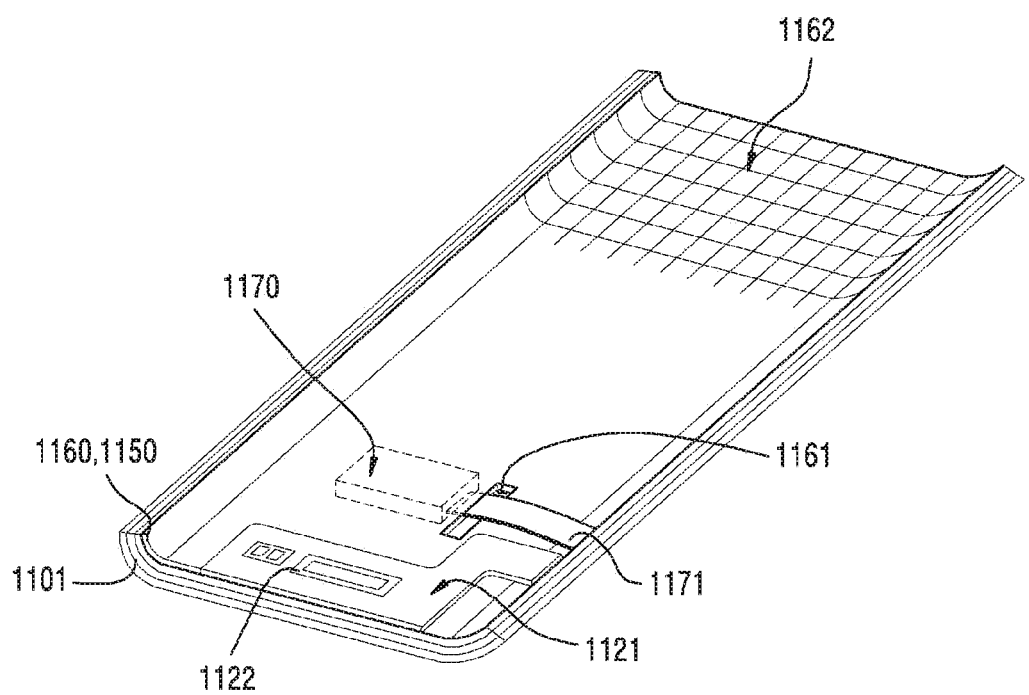

Referring to FIGS. 11A and 11B, an electronic device (for example, 101 of FIG. 4) according to one embodiment may further include a detecting panel 1160 (for example, a digitizer panel) attached to a lamination 1101 of a transparent member 1110, a display panel 1120, a light absorbing member 1130, and a buffer member 1140. In an embodiment, the detecting panel 1160 may further include a heat-radiating plate 1150. The detecting panel 1160 may be attached under the buffer member 1140. An adhesive layer 1141 may be interposed between the detecting panel 1160 and the buffer member 1140 so as to enable the same to be attached to each other. In an embodiment, the heat-radiating plate 1150 may be disposed under the detecting panel 1160. In another embodiment, the heat-radiating plate 1150 may be disposed on the detecting panel 1160.

The detecting panel 1160 may detect a user's separate input applied to the transparent member 1110 other than touch input. For example, the detecting panel 1160 may be a detecting panel for detecting a position of input by interacting with a resonance circuit included in a position indicator (for example, a stylus pen), the input using electromagnetic radiation (EMR). The detecting panel may be referred to as an EMR detecting panel or a digitizer panel.

According to one embodiment, in a view from above, the detecting panel 1160 and/or the heat-radiating plate 1150 may be disposed to substantially cover the entire region of the transparent member 1110. The detecting panel 1160 may have an area corresponding to an activated region of the display panel 1120. Therefore, in a view from above, the detecting panel 1160 may be designed to cover at least a part of a fingerprint sensor 1170. The detecting panel 1160 may include a slit 1161 through which a first flexible printed circuit board 1171 for connecting the fingerprint sensor 1170 to a main printed circuit board is withdrawn. The slit 1161 may have a length which is equal to or longer than a width of the first flexible printed circuit board 1171.

According to one embodiment, the detecting panel 1160 may include a plurality of conductive patterns 1162 for detecting an indication position. For example, the detecting panel 1160 may include a plurality of loop coil patterns 1162. The density of the plurality of conductive patterns 1162 may be proportional to the accuracy of the indication position detection of the detecting panel 1160. The plurality of conductive patterns 1162 may not be arranged in a region, in which the slit 1161 is formed, of the detecting panel 1160. According to one embodiment, the detecting panel 1160 may be configured to further perform an additional process for detecting an indication position with respect to the region in which the slit 1161 is formed, through a compensation process using conductive patterns arranged around the region in which the slit 1161 is formed.

According to one embodiment, the fingerprint sensor 1170 may be operatively connected to at least one processor (for example, the processor 120 of FIG. 1) in order to receive a driving signal or transmit detected fingerprint information. In an aspect of hardware, an operational connection between a fingerprint sensor and at least one processor may be achieved through a printed circuit board. An interconnection method between printed circuit boards may be applied as one method among a method (for example, a connector) using a coupling method, a bonding method (for example, soldering) using heat, light, or the like, a contact method (for example, a pogo-pin and a C-clip), a connection method (for example, and a conductive adhesive agent) using an adhesive agent, or a combination thereof. Hereinafter, a printed circuit board on which a main processor is mounted may be defined as a main printed circuit board. According to one embodiment, the first flexible printed circuit board 1171 of the fingerprint sensor 1170 may be directly connected to a main printed circuit board 1180 (for example, 350 of FIG. 4). According to another embodiment, the first flexible printed circuit board 1171 of the fingerprint sensor 1170 may be connected to a main printed circuit board through a sub printed circuit board. The first flexible printed circuit board 1171 may be connected to the sub printed circuit board, and the sub printed circuit board may be connected to the main printed circuit board. According to another embodiment, the first flexible printed circuit board 1171 of the fingerprint sensor 1170 may be connected to a second flexible printed circuit board 1121 connected to the main printed circuit board 1180 so as to transmit, to at least one processor, power and a signal for controlling the display panel 1120. In an embodiment, the second flexible printed circuit board 1121 may include at least one processor 1122 (for example, a driver IC) mounted thereon and operating the display panel 1120. According to another embodiment, a printed circuit board for the fingerprint sensor 1170 and a printed circuit board for the display panel 1120 may be integrally formed. For example, an integrated printed circuit board of the fingerprint sensor 1170 and the display panel 1120 may be directly connected to a main printed circuit board. The integrated printed circuit board may be connected to the main printed circuit board through a sub printed circuit board.

Figure 11C:
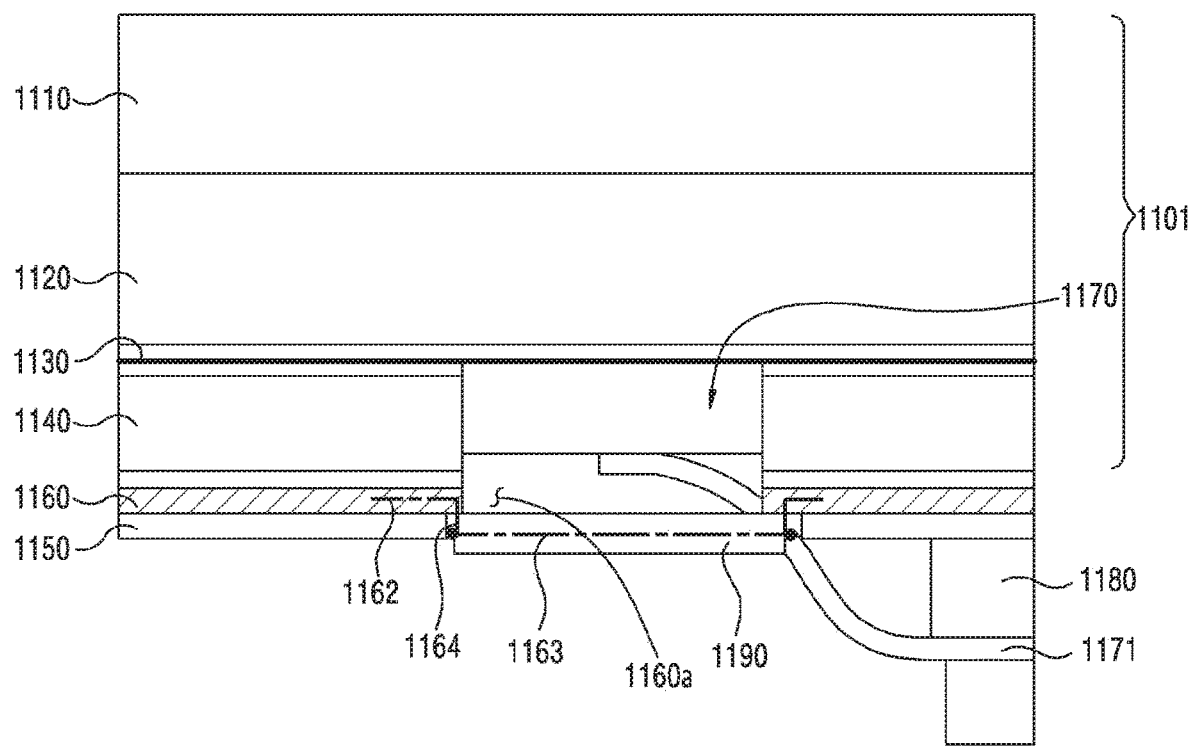
FIGS. 11C and 11D illustrate other examples of an arrangement structure of a fingerprint sensor in an electronic device according to embodiments of the disclosure.
Figure 11D:
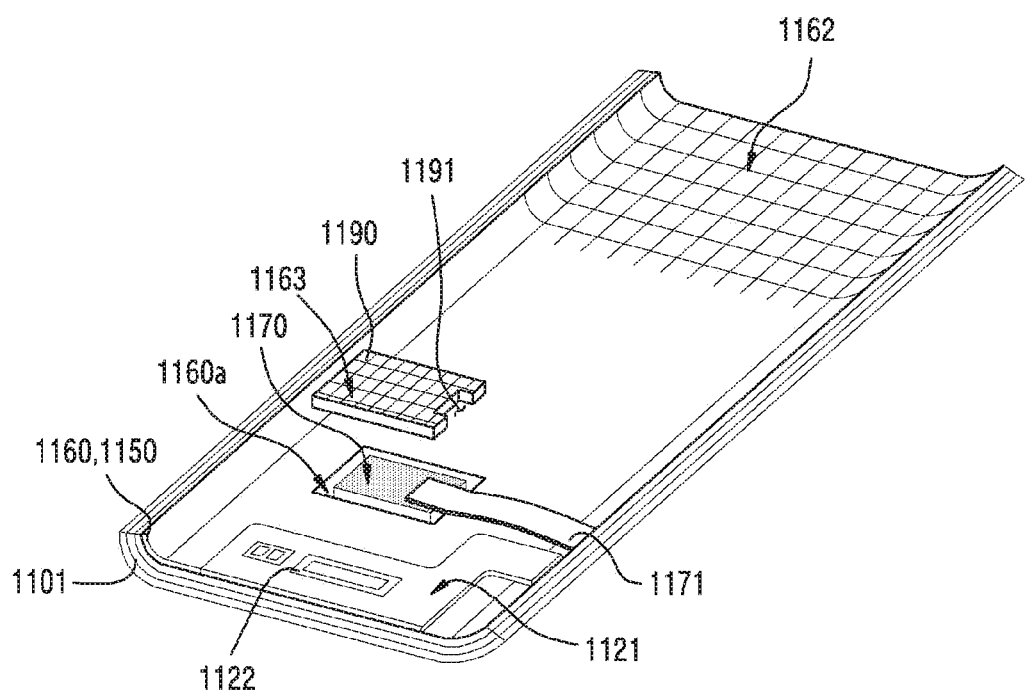

Referring to FIGS. 11C and 11D, a detecting panel 1160 according to one embodiment may include an opening 1160a in which a fingerprint sensor 1170 may be mounted. An area of the opening 1160a may be larger than an area of the fingerprint sensor 1170 so as to enable the fingerprint sensor 1170 to be mounted therein. According to one embodiment, the detecting panel 1160 may further include an auxiliary detecting panel 1190. The auxiliary detecting panel 1190 may have an area capable of covering the opening 1160a, and may be disposed at a position at which the auxiliary detecting panel may cover the opening 1160a. The auxiliary detecting panel 1190 may include an auxiliary conductive pattern 1163. When the auxiliary detecting panel 1190 is disposed on the opening 1160a, a plurality of conductive patterns 1161 formed on the detecting panel 1160 and the auxiliary conductive pattern 1163 of the auxiliary detecting panel 1190 may be electrically connected to each other. The electrical connection between the plurality of conductive patterns 1161 and the auxiliary conductive pattern 1163 may employ at least one of soldering, wiring, a pogo-pin, and a C-clip. For example, the plurality of conductive patterns 1161 and the auxiliary detecting panel 1190 may be electrically connected to each other through solder 1164. According to one embodiment, the detecting panel 1160 may detect an indication position by using the auxiliary conductive pattern 1163 included in the auxiliary detecting panel 1190, even in a region in which the opening 1160a is formed.

According to one embodiment, the auxiliary detecting panel 1190 may include a slit 1191 through which a first flexible printed circuit board 1171 for connecting the fingerprint sensor 1170 to at least one processor, is withdrawn. The slit 1191 may be formed to be at least one of an opening formed through one lateral surface of the auxiliary detecting panel 1190 and a long hole formed through the auxiliary detecting panel. Embodiments are not limited thereto, and even in an embodiment including the auxiliary detecting panel 1190, a slit for the first flexible printed circuit board 1171 may be formed on the detecting panel 1160.

FIGS. 12A to 12F illustrate examples of a structure of a fingerprint sensor according to an embodiment of the disclosure. Fingerprint sensors described in FIGS. 12A to 12F may be embodiments of the fingerprint sensors 640, 740, 840, 940, 1040, and 1170 described in FIGS. 6A to 11D.

Figure 12A:
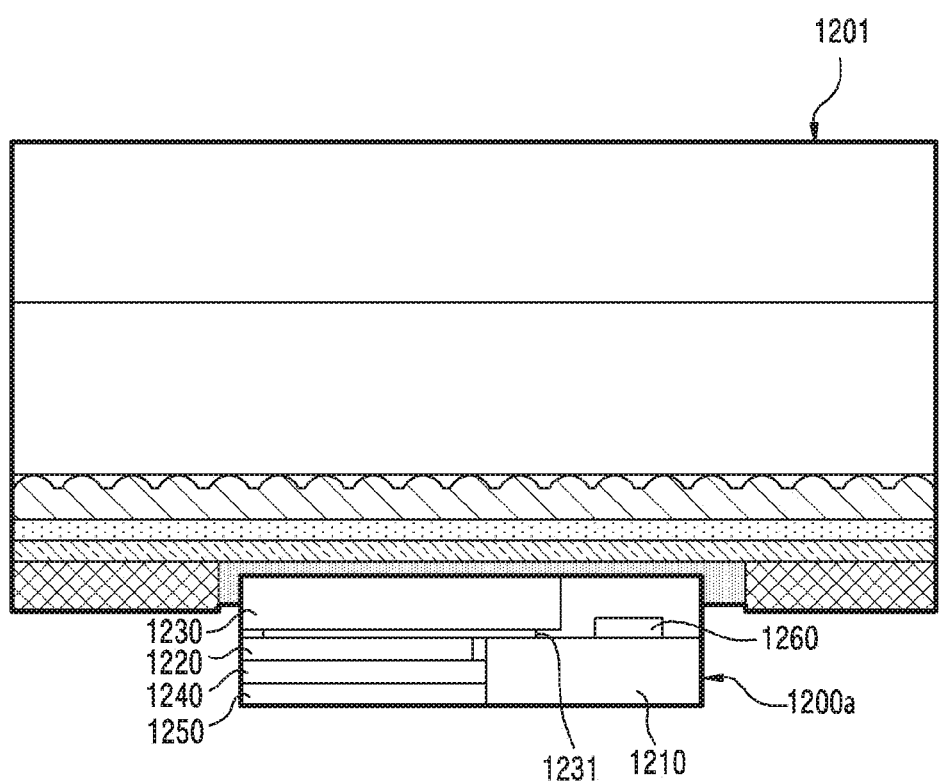
FIGS. 12A to 12F illustrate examples of a structure of a fingerprint sensor according to an embodiment of the disclosure.

Referring to FIG. 12A, a fingerprint sensor 1200a according to one embodiment may be attached to a lamination 1201a including a transparent member, a display panel, and a light absorbing member. The lamination 1201 may be one of the various embodiments described in FIGS. 6A to 11D, in which the fingerprint sensor is attached, or have a combination structure of at least two or more embodiments.

The fingerprint sensor 1200a according to one embodiment may include a base substrate 1210, and an ultrasonic wave oscillator 1220, an ultrasonic wave receiver 1230, a first oscillator electrode 1240, and a sound absorbing member 1250 which are mounted on the base substrate. The ultrasonic wave oscillator 1220 may generate an ultrasonic wave by using the piezoelectric effect. To this end, a second oscillator electrode 1231 may be interposed between the ultrasonic wave receiver 1230 and the ultrasonic wave oscillator 1220. The ultrasonic wave oscillator 1220 may generate an ultrasonic wave by repeating expansion and contraction by means of a voltage applied by the first oscillator electrode 1240 and the second oscillator electrode 1231 which are disposed on upper and lower surfaces thereof. The first oscillator electrode 1240 and the second oscillator electrode 1231 may be metal layers with which the upper and lower surfaces of the ultrasonic wave oscillator 1220 are coated.

The ultrasonic wave receiver 1230 may include a piezoelectric reception layer and an array of pixel circuits arranged on a substrate (or a backplane). In an embodiment, each of pixel circuits may include a circuit wire and at least one thin film transistor film element. According to one embodiment, the ultrasonic wave receiver 1230 may include a piezoelectric reception layer and an array of pixel circuits arranged on a substrate made of glass. In an embodiment, the ultrasonic wave receiver 1230 may receive an ultrasonic wave reflected from an external object (for example, 550 of FIG. 5A), and convert the energy of the received ultrasonic wave into electric charges through a piezoelectric reception layer. The fingerprint sensor 1200*a* may be configured to provide an image of the external object by using these electric charges.

The ultrasonic wave receiver 1230 and the ultrasonic wave oscillator 1220 are overlappingly and vertically laminated, and the fingerprint sensor 1200*a* according to one embodiment may be thus alternately operated according to divided operations including an ultrasonic wave generation operation of the ultrasonic wave oscillator 1220 and an ultrasonic wave reception operation of the ultrasonic wave receiver 1230.

According to one embodiment, an ultrasonic wave generated by the ultrasonic wave oscillator 1220 may be not only transmitted to an exposed surface (for example, 711 of FIG. 7A) of a transparent member through the ultrasonic wave receiver 1230, but also generated toward an inner part of an electronic device (for example, 101 of FIG. 4), namely in a direction opposite to the exposed surface. The sound absorbing member 1250 may function to absorb the ultrasonic wave generated toward the opposite direction. The sound absorbing member 1250 according to one embodiment may be made of any suitable elastic material. For example, the sound absorbing member 1250 may be made of a porous material so as to absorb an ultrasonic wave. The porous material may be a material containing many micro holes or gaps therein. A sound wave incident into the porous material may be transmitted through air in a hole or a gap so as to be penetrated into the material. The penetrated sound wave may be converted into the thermal energy inside the sound absorbing member 1250, and thus prevent the performance degradation due to an ultrasonic wave of other electronic parts or the fingerprint sensor 1200*a* in advance. For example, the sound absorbing member 1250 may include an epoxy film.

According to another embodiment, the ultrasonic wave receiver 1230 of the fingerprint sensor 1200*a* may include a polymer material. For example, the ultrasonic wave receiver 1230 may include a thin film transistor film layer, a piezoelectric reception layer, and an array of a plurality of pixel circuits arranged on a substrate (or a backplane) made of a polymer material.

When the ultrasonic wave receiver 1230 is formed to be a substrate made of a polymer material, the acoustic impedance matching may be advantageous. In an embodiment of the disclosure, components with which the ultrasonic wave receiver 1230 may mate may indicate an acrylic adhesive layer (for example, 533 of FIG. 5A), an epoxy-based adhesive agent (for example, 650 of FIG. 6D), a polymer-based base layer (for example, 631 of FIG. 6D), and the like. The elastic modulus of glass may be approximately 65-69 GPa. The elastic moduli of the epoxy-based material, PET based on a polymer, and the acrylic material may be approximately 2 GPa, 2.7 GPa, and 0.1 MPa, respectively. That is, the elastic modulus of glass may be greatly different from the elastic moduli of general materials which function as a medium of an ultrasonic wave in an electronic device according to an embodiment of the disclosure. Therefore, by comparing with a case in which the ultrasonic wave receiver 1230 is formed to be a substrate made of glass, when the ultrasonic wave receiver is formed to be a substrate made of a polymer material, the impedance matching may be easily achieved, and the transmission rate of an ultrasonic wave may be improved. Accordingly, the fingerprint sensor 1200*a* may have an improved fingerprint recognition function.

According to one embodiment, the fingerprint sensor 1200*a* including the ultrasonic wave receiver 1230 made of a polymer material can be attached, by means of a roll forming process, to a lamination including at least one of a transparent member, a display panel, and a light absorbing member. For example, a process of bonding the fingerprint sensor 1200*a*, by means of the roll forming, to a module which includes a display panel and is prepared as a single module including an impact preventing layer (for example, 960 of FIGS. 9A and 9B), a detecting panel (for example, 1160 of FIG. 11A), and the like is possible. In the case of a fingerprint sensor including an ultrasonic wave receiver formed to be a glass substrate, the fingerprint sensor or a display panel may be damaged due to the glass broken by the pressure of a roller in the roll forming process, while in the case of the ultrasonic wave receiver 1230 made of a polymer material, the roll forming process is possible, and a process of mounting the fingerprint sensor 1200*a* may be thus easily performed.

According to an embodiment, the fingerprint sensor 1200*a* may include a processor 1260 (or a controller) of a fingerprint sensor, the processor applying a driving signal to a detector (for example, the ultrasonic wave oscillator 1220 and the ultrasonic wave receiver 1230). The processor 1260 may be mounted on the base substrate 1210 of the fingerprint sensor 1200*a*. The processor 1260 may be referred to as an ultrasonic fingerprint sensor controller or an application specific integrated circuit (ASIC). According to one embodiment, the processor 1260 and the detectors 1220 and 1230 may be implemented together as a module such as a chip size package (CSP) or a wafer level package (WLP). Embodiments are not limited thereto, and the processor 1260 of the fingerprint sensor may be disposed on a main printed circuit board (for example, 350 of FIG. 4) or a printed circuit board (for example, 1121 of FIG. 11A) of a display panel.

Figure 12B:
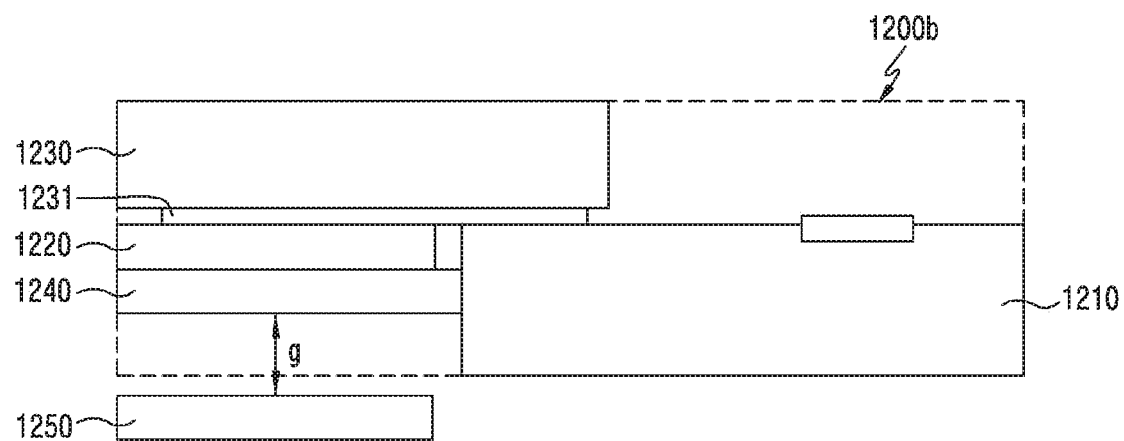

Referring to FIG. 12B, a sound absorbing member 1250 according to one embodiment may be separately implemented from a fingerprint sensor 1200*b*. For example, the sound absorbing member 1250 may be disposed to be spaced a predetermined distance (g) apart from an ultrasonic wave oscillator 1240. An ultrasonic wave (of the opposite direction) generated by the ultrasonic wave oscillator 1240 may be transmitted to the sound absorbing member 1250 spaced the predetermined distance (g) apart therefrom by using air as a medium. When ultrasonic waves are transmitted through air, the energy loss due to the impedance mismatching is great, and the sound absorbing member 1250 may thus effectively absorb the remaining ultrasonic waves.

According to one embodiment, the sound absorbing member 1250 disposed separately from the fingerprint sensor 1200*b* may be attached to various components positioned under the fingerprint sensor 1200*b*. For example, the sound absorbing member 1250 may be fixed to one of a main printed circuit board (for example, 350 of FIG. 4), a battery (for example, 360 of FIG. 4), and a rear housing (for example, 320 of FIG. 4), which may be positioned under the fingerprint sensor 1200*b*.

Figure 12C:
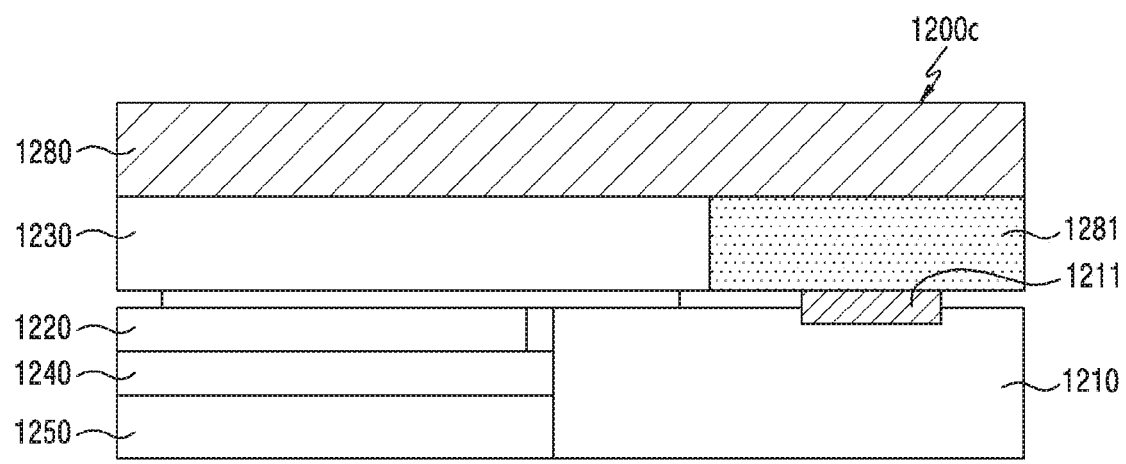

Referring to FIG. 12C, a fingerprint sensor 1200*c* according to one embodiment may include a noise shielding layer 1280. The noise shielding layer 1280 may shield noise which may occur at the display panel 820 and the like and thus improve the electro-magnetic compatibility (EMC) of the fingerprint sensor 1280. The noise shielding layer 1280 may cover a detector (for example, the ultrasonic wave receiver 1230) of the fingerprint sensor 1200*e*. According to one embodiment, the noise shielding layer 1280 may be electrically connected to an earthing portion 1211 (or an earthing pad) of a base substrate 1210 so as to be earthed. For example, a conductive adhesive layer 1281 (or a conductive tape) may be interposed between the noise shielding layer 1280 and the earthing portion 1211. In another embodiment, the noise shielding layer 1280 may be electrically connected to the earthing portion 1211 by using at least one method among soldering, wiring, a pogo-pin, and a C-clip.

Figure 12D:
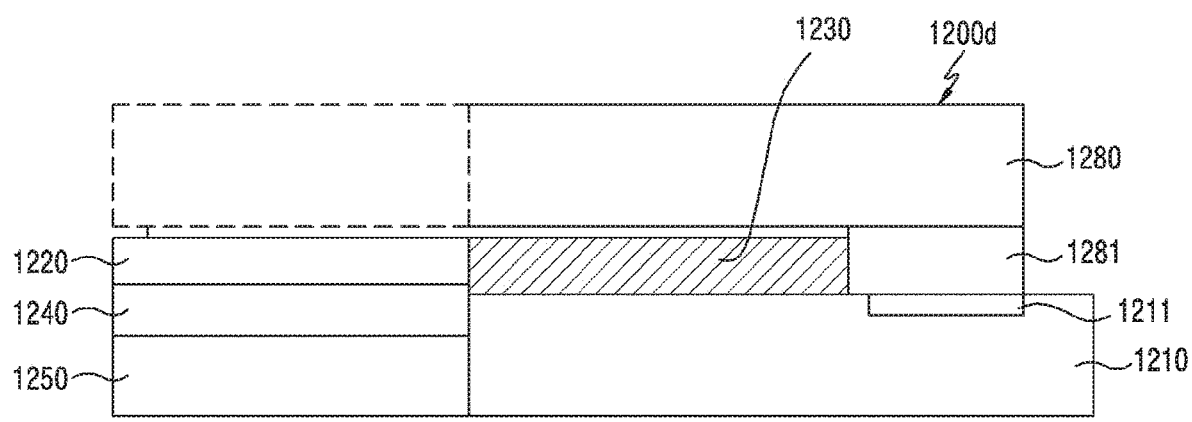

Referring to FIG. 12D, a fingerprint sensor 1200*d* according to one embodiment may has a structure in which an ultrasonic wave oscillator 1220 and an ultrasonic wave receiver 1230 are horizontally arranged. In a view from above, the ultrasonic wave oscillator 1220 and the ultrasonic wave receiver 1230, which are arranged according to the horizontal arrangement structure, do not mutually overlap each other, and are thus simultaneously operable, thereby improving the fingerprint recognition speed. According to one embodiment, a noise shielding layer 1280 may have a size and a shape which are capable of covering both the ultrasonic wave oscillator 1220 and the ultrasonic wave receiver 1230. In an embodiment, the noise shielding layer 1280 may have a size and a shape which are capable of covering only the ultrasonic wave receiver 1230.

Figure 12E:
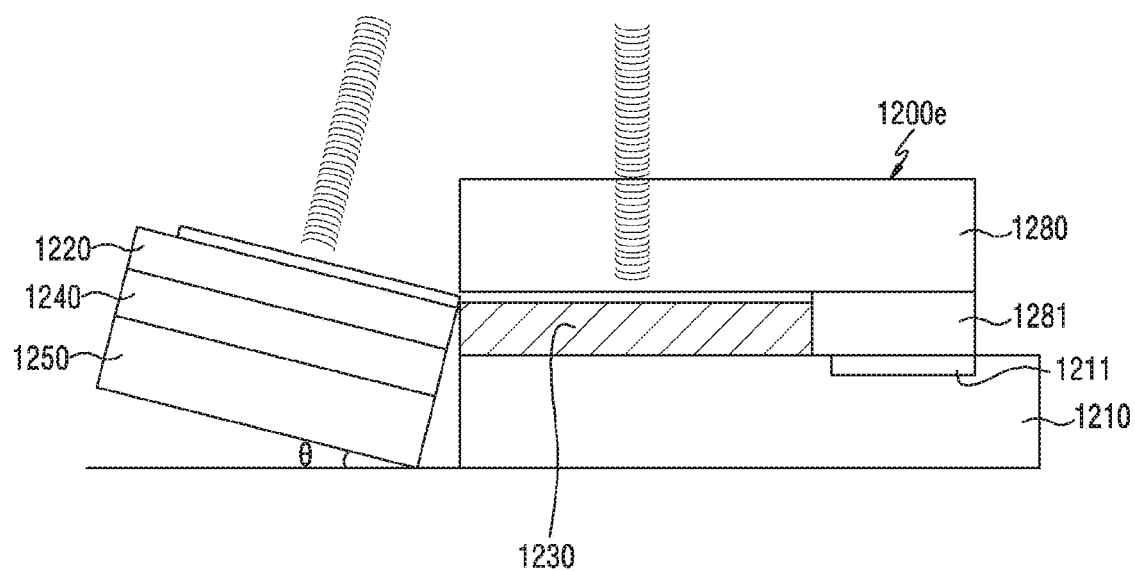

Referring to FIG. 12E, an ultrasonic wave oscillator 1220 and/or an ultrasonic wave receiver 1230, which are horizontally arranged according to an embodiment, may be disposed to be inclined. For example, the ultrasonic wave oscillator 1220 may be disposed to be inclined at a predetermined angle (θ) with reference to the horizontal. As the ultrasonic wave oscillator 1220 is inclined at the predetermined angle (θ), the reception rate of an ultrasonic wave which is reflected from an external object (for example, 550 of FIG. 5A) and then received by the ultrasonic wave receiver 1230 may be increased in comparison to an ultrasonic wave generated by the ultrasonic wave oscillator 1220. Accordingly, a fingerprint sensor 1200*e* may have an improved fingerprint recognition rate. Embodiments are not limited thereto, and the ultrasonic wave receiver 1230 may be disposed to be inclined and both the ultrasonic wave oscillator 1220 and the ultrasonic wave receiver 1230 may be disposed to be inclined toward each other.

Figure 12F:
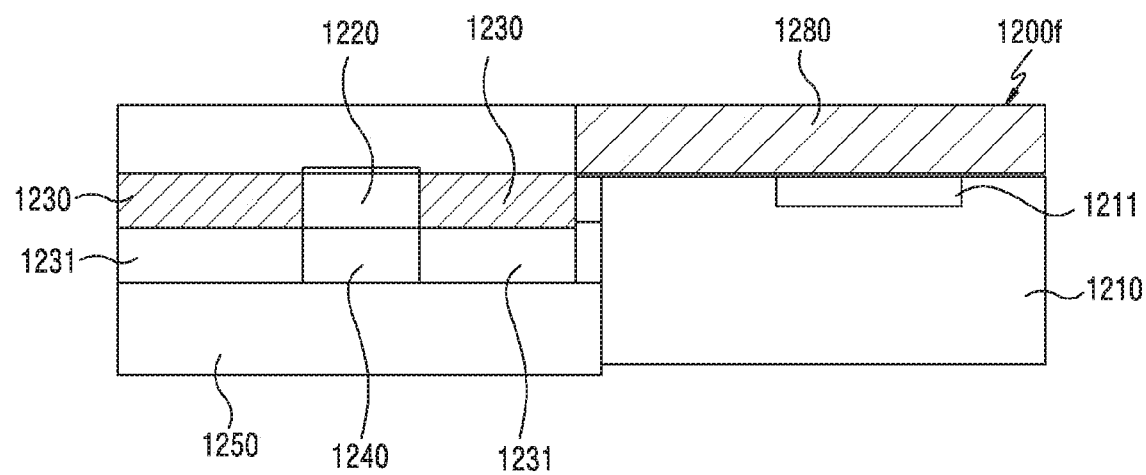

In regard to an embodiment in which an ultrasonic wave oscillator 1220 and an ultrasonic wave receiver 1230 are horizontally arranged, FIG. 12F illustrates various arrangement examples of the ultrasonic wave oscillator 1220 and the ultrasonic wave receiver 1230. The ultrasonic wave receiver 1230 according to one embodiment may be disposed to enclose at least a part of the ultrasonic wave oscillator 1220. Accordingly, a fingerprint sensor 1200*f* may have an improved fingerprint recognition rate. The fingerprint sensor 1220*j*, in which the ultrasonic wave receiver 1230 according to one embodiment is disposed to enclose at least a part of the ultrasonic wave oscillator 1220 may further include a noise shielding layer 1280. The noise shielding layer 1280 may be disposed to cover at least a part of a detector (the ultrasonic wave receiver 1230 and the ultrasonic wave oscillator 1220).

Figure 13A:
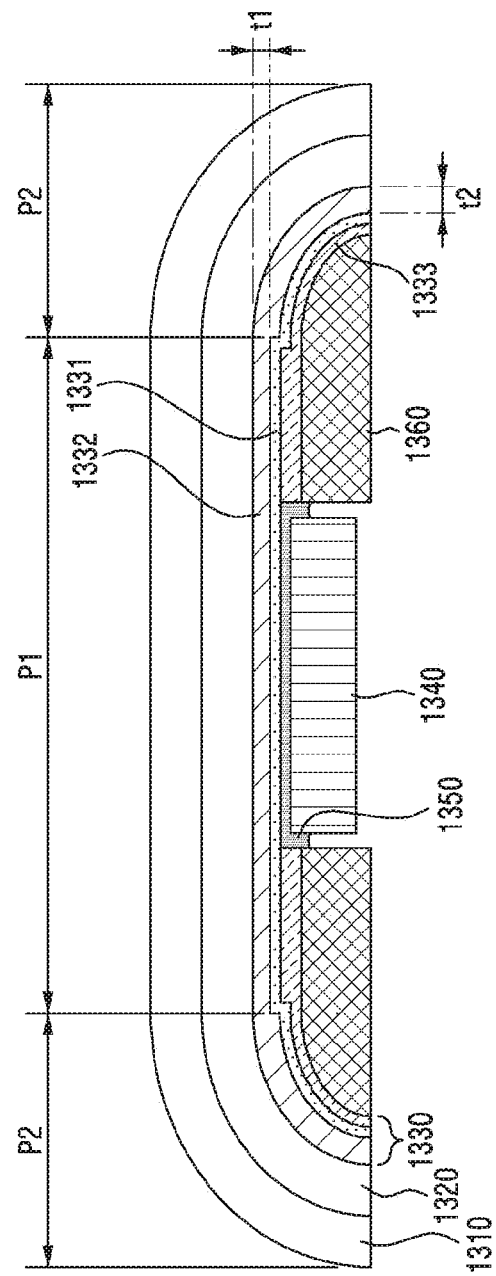
FIGS. 13A and 13B are cross-sectional views illustrating other examples of a light absorbing member according to a display panel structure in an electronic device according to an embodiment of the disclosure.
Figure 13B:
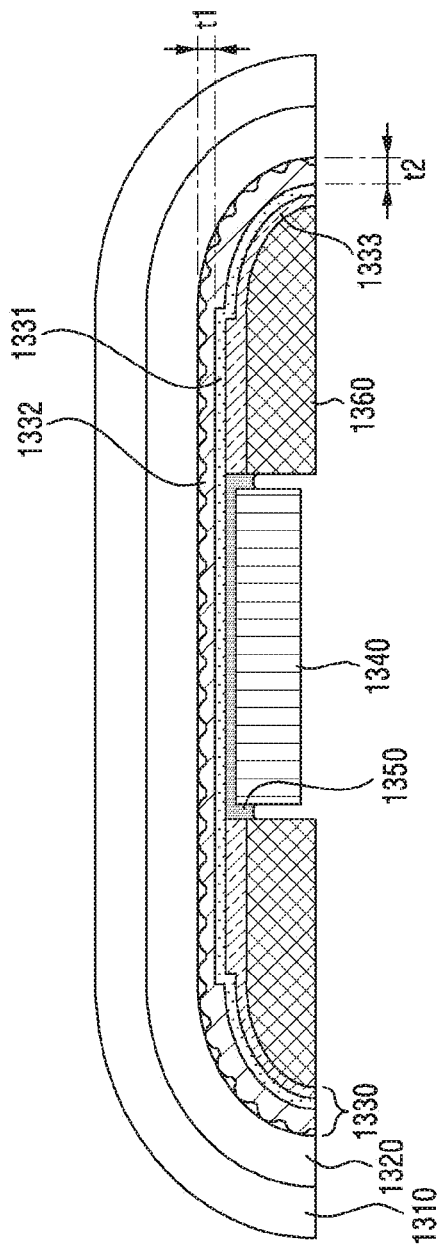

FIGS. 13A and 13B are cross-sectional views illustrating other examples of a light absorbing member according to a display panel structure in an electronic device according to an embodiment of the disclosure.

Referring to FIG. 13A, a fingerprint sensor 1340 (for example, the fingerprint sensor 540 of FIG. 5A) according to one embodiment may be disposed under a lamination in which a transparent member 1310 (for example, the transparent member 1110 of FIG. 11A), a display panel 1320 (for example, the display panel 1120 of FIG. 11A), and a light absorbing member 1330 (for example, the light absorbing member 1130 of FIG. 11A) are sequentially laminated. At least one edge of the transparent member 1310 may have the curvature. The display panel 1320 may be laminated under the transparent member 1310, and may be formed to correspond to a shape of a lower surface of the transparent member 1310. As shown in FIGS. 13A and 13B, the transparent member 1310 and the display panel 1320 may be configured in a two-side edge structure in which opposite edges have the curvature. According to various embodiments, the transparent member 1310 and the display panel 1320 may be configured in a four-side edge structure in which all edges have the curvature.

The light absorbing member 1330 may include: a base layer 1331; and a first adhesive layer 1332 (or an upper adhesive layer) and a second adhesive layer 1333 (or a lower adhesive layer) which are disposed on opposite surfaces of the base layer 1331.

According to one embodiment, a thickness t1 of the first adhesive layer 1332 corresponding to a flat region of the transparent member 1310 and a thickness t2 of the first adhesive layer 1332 corresponding to an edge region of the transparent member 1310 may be formed to be different. A thickness of the first adhesive layer 1332 in a flat region P1 may be properly selected in order to improve a performance of the fingerprint sensor 1340. The first adhesive layer 1332 in the flat region P1 may be formed to have the minimum thickness in order to secure a performance of the fingerprint sensor 1340.

The thickness t2 of the first adhesive layer 1332 in an edge region P2 may be thicker than the thickness t1 of the first adhesive layer 1332 in the flat region P1. In the edge region P2, the adhesive force of the display panel 1320 is reduced, and a waterproof problem may thus occur. According to various embodiments, in order to improve the adhesive force and/or the waterproof performance of the edge region P2 of the display panel 1320, the first adhesive layer 1332 in the edge region P2 may formed to be thick. The thickness of the first adhesive layer 1332 in each of the flat region P1 and the edge region P2 may be properly configured to secure the adhesive force and/or the waterproof performance of a display module as well as a performance of the fingerprint sensor 1340.

According to one embodiment, as shown in FIG. 6B, the light absorbing member 1330 may further include an additional adhesive layer (for example, the third adhesive layer 635 of FIG. 6B) and an additional base layer (for example, the second base layer 634 of FIG. 6B) between the base layer 1331 and the second adhesive layer 1333.

The base layer 1331 may be formed to be bent at a boundary portion between the flat region P1 and the edge region P2 in order to obtain a shape of the first adhesive layer 1332. Through the bent portion, the thickness of the first adhesive layer 1332 may be formed to be different in each of the flat region P1 and the edge region P2.

According to one embodiment, at least a part of the light absorbing member 1330 may include an opening formed therethrough to receive the fingerprint sensor 1340. The second adhesive layer 1333 may include an opening formed to be larger than the fingerprint sensor 1340 to enable the fingerprint sensor 1340 to be received therein. In a view from above, an opening 1333*a* may have an area corresponding to a fingerprint detection region S1 (for example, 311 of FIG. 4) of the transparent member 1310. In the light absorbing member 1330, the base layer 1331 may be exposed to the outside in a region 1331*a* including the opening 1333*a* formed therein. The light absorbing member 1330 according to one embodiment may be manufactured according to a method in which, in a process of disposing the first adhesive layer 1332 and the second adhesive layer 1333 on the opposite surfaces of the base layer 1331, the adhesive layers are disposed only in a region excluding the opening 1333*a*.

According to various embodiments, in case the light absorbing member 1330 includes an additional base layer and an additional adhesive layer, the additional base layer and the additional adhesive layer may also include openings formed therethrough to correspond to the second adhesive layer 1333.

In order to secure the adhesive force, a thickness of the second adhesive layer 1333 may be configured to be different in each of the flat region P1 and the edge region P2. The illustrated second adhesive layer 1333 is formed to have a thin thickness in the edge region P2, and may thus correspond to a shape of a buffer member 1360. According to various embodiments, unlike what is illustrated, the thickness of the second adhesive layer 1333 may be formed to be uniform, and the second adhesive layer 1333 may be formed to correspond to a shape of the base layer 1331.

The fingerprint sensor 1340 may be attached to the base layer 1331 by using an adhesive agent 1350. According to one embodiment, the liquid adhesive agent 1350 may be applied to the exposed region 1331*a* and an inner surface of the opening 1333*a*. After the liquid adhesive agent 1350 is applied, a process of removing bubbles existing between the liquid adhesive agent 1350 and the base layer 1331 may be added.

The buffer member 1360 (for example, the buffer member 960 of FIG. 9A) may be attached under the second adhesive layer 1333. As described above, an elastic material may be applied to the buffer member 1360 in order to absorb and mitigate external impact applied to the transparent member 1310. In addition, the buffer member 1360 may be disposed not to be positioned on an ultrasonic wave transmitting path.

In addition, the fingerprint sensor 1340 may be disposed not to protrude to the outside beyond the buffer member 1360. The buffer member 1360 may prevent the fingerprint sensor 1340 from being damaged due to not only the external impact applied to the transparent member 1310 but also the impact which may be caused below.

According to various embodiments, in order to prevent the fingerprint sensor 1340 from being damaged due to the impact caused below, the buffer member 1360 may extend, from a lateral side of an opening 1360*a*, to cover at least a part of an exposed surface of the fingerprint sensor 1340.

Referring to FIG. 13B, an adhesion surface, which faces a display panel 1320, of a first adhesive layer 1332 may have an embossed pattern.

According to one embodiment, the first adhesive layer 1332 including the embossed pattern may be attached to the display panel 1320 while being in close contact with the same, and may thus improve a waterproof performance of a lateral side of the display panel 1320 and increase the adhesive force.

According to one embodiment, as shown in FIG. 13A, the first adhesive layer 1332 may be formed to have various thicknesses. A thickness t2 of the first adhesive layer 1332 in an edge region may be formed to be thicker than a thickness t1 of the first adhesive layer 1332 in a flat region. In the edge region, the first adhesive layer 1332 may have a thick thickness and thus secure the improved adhesive force and waterproof performance.

According to one embodiment, as shown in FIG. 7D, the first adhesive layer 1332 in the flat region may be formed to be flat instead of having the embossed pattern.

According to various embodiments, as shown in FIG. 7D, an electronic device may further include: an additional adhesive layer (for example, the second adhesive layer 735 of FIG. 7B); and an additional base layer (for example, the second base layer 736 of FIG. 7B) between a base layer 1331 and a second adhesive layer 1333 in order to secure the adhesive force at a lateral side thereof.

The electronic device may further include a heat-radiating plate (not shown), a detecting panel (a digitizer panel, not shown), a pressure sensor, and the like, which are not illustrated in FIGS. 13A and 13B. That is, the electronic device may further include a configuration which is described in FIGS. 6A to 12F, but not illustrated in FIGS. 13A and 13B.

An electronic device according to one embodiment of the disclosure may include: a transparent member (for example, the transparent member 610 of FIG. 6B); a display panel disposed under the transparent member (for example, the display panel 620 of FIG. 6B); an ultrasonic sensor (for example, the ultrasonic sensor 640 of FIG. 6B) disposed under the display panel and acquiring biometric information from an external object adjacent to the transparent member by using an ultrasonic wave having been transmitted through the display panel and the transparent member; and a light absorbing member (for example, the light absorbing member 630 of FIG. 6B) for absorbing at least a part of external light incident into the ultrasonic sensor through the transparent member and the display panel, wherein the light absorbing member is disposed between the display panel and the ultrasonic sensor.

In an electronic device according to one embodiment of the disclosure, the light absorbing member may be formed to have a different thickness for each of a region corresponding to the ultrasonic sensor and a remaining region.

In an electronic device according to one embodiment of the disclosure, the light absorbing member may include: a first base layer (for example, the first base layer 631 of FIG. 6B); a first adhesive layer (for example, the first adhesive layer 632 of FIG. 6B) disposed on the first base layer to be attached to the display panel; and a second adhesive layer (for example, the second adhesive layer 635 of FIG. 6B) disposed under the first base layer.

In an electronic device according to one embodiment of the disclosure, the first adhesive layer may include at least one embossed pattern (for example, the embossed pattern 733*a* of FIG. 7C) formed on a surface facing the display panel.

In an electronic device according to one embodiment of the disclosure, the first adhesive layer may include a flat portion formed on a surface thereof facing the display panel, in at least a part of a region corresponding to the ultrasonic sensor.

In an electronic device according to one embodiment of the disclosure, the second adhesive layer may include an opening (for example, the opening 630a of FIG. 6B) formed in a region corresponding to the ultrasonic sensor.

In an electronic device according to one embodiment of the disclosure, the ultrasonic sensor may be attached to one part of the first base layer, the one part being exposed through the opening, by means of an adhesive agent (for example, the adhesive agent 650 of FIG. 6B) disposed between the ultrasonic sensor and the one part of the first base layer.

In an electronic device according to one embodiment of the disclosure, the light absorbing member may further include: a third adhesive layer (for example, the third adhesive layer 635 of FIG. 6B) disposed between the second adhesive layer and the first base layer; and a second base layer (for example, the second base layer 634 of FIG. 6B) disposed under the third adhesive layer.

In an electronic device according to one embodiment of the disclosure, the second adhesive layer, the second base layer, and the third adhesive layer may include openings (for example, the opening 630a of FIG. 6B) formed in a region corresponding to the ultrasonic sensor.

An electronic device according to one embodiment of the disclosure may further include a conductive member (for example, the conductive member 1044 of FIG. 10) for blocking noise occurring at the display panel, and the conductive member may be electrically connected to an earthing portion of the electronic device, between the light absorbing member and the ultrasonic sensor.

In an electronic device according to one embodiment of the disclosure, the conductive member may be connected to an earthing portion of the electronic device through the connection with an earthing pad (for example, the earthing portion 1211 (or the earthing pad) of FIG. 12C) on a printed circuit board of the ultrasonic sensor, and the ultrasonic sensor may further include a conductive tape (for example, the conductive adhesive layer 1280 (or the conductive tape) of FIG. 12C) so as to electrically connect the conductive member and the earthing pad.

In an electronic device according to one embodiment of the disclosure, the light absorbing member may include a black coated layer and a conductive member for blocking noise occurring at the display panel, which are disposed between the first adhesive layer and the second adhesive layer.

In an electronic device according to one embodiment of the disclosure, the conductive member may least cover a region corresponding to the ultrasonic sensor.

An electronic device according to one embodiment of the disclosure may further include a buffer member (for example, the buffer member 960 of FIG. 9A) for mitigating the impact toward a direction in which the display panel is pressed, the buffer member being disposed under at least a part of the light absorbing member positioned on a lateral side of the ultrasonic sensor, and the buffer member may be formed to be higher than height of the ultrasonic sensor.

An electronic device according to one embodiment of the disclosure may further include a detecting panel (for example, the detecting panel 1160 of FIG. 11A) disposed under at least a part of the buffer member.

In an electronic device according to one embodiment of the disclosure, the detecting panel may include a slit (for example, the slit 1161 of FIG. 11A) through which a printed circuit board of the ultrasonic sensor is withdrawn.

In an electronic device according to one embodiment of the disclosure, the ultrasonic sensor may include an ultrasonic wave oscillator (for example, the ultrasonic wave oscillator 1220 of FIG. 12A) for oscillating an ultrasonic wave, and an ultrasonic wave receiver (for example, the ultrasonic wave receiver 1230 of FIG. 12B) for receiving the ultrasonic wave reflected from an external object, wherein at least a part of the ultrasonic wave receiver may be disposed while being in close contact with the light absorbing member.

An electronic device according to one embodiment of the disclosure may include: a transparent member (for example, the transparent member 1310 of FIG. 13A) including a planar region (for example, the planar region P1 of FIG. 13A) and a curved region (for example, the curved region P2 of FIG. 13A) disposed on at least one edge of the planar region; a display panel (for example, the display panel 1320 of FIG. 13A) disposed under the transparent member and including a planar region and a curved region formed to correspond to a shape of the transparent member; an ultrasonic sensor (for example, the ultrasonic sensor 1340 of FIG. 13A) disposed under the display panel and acquiring biometric information from an external object adjacent to the transparent member by using an ultrasonic wave having been transmitted through the display panel and the transparent member; and an light absorbing member (for example, the light absorbing member 1330 of FIG. 13A) for absorbing at least a part of external light incident into the ultrasonic sensor through the transparent member and the display panel, wherein the light absorbing member is disposed between the display panel and the ultrasonic sensor, and the light absorbing member positioned under the planar region may be formed to have a different thickness from the light absorbing member positioned under the curved region.

In an electronic device according to one embodiment of the disclosure, the light absorbing member may include: a first base layer (for example, the first base layer 1310 of FIG. 13A); a first adhesive layer (for example, the first adhesive layer 1332 of FIG. 13A) disposed on the first base layer to be attached to the display panel; and a second adhesive layer (for example, the second adhesive layer 1333 of FIG. 13A) disposed under the first base layer.

In an electronic device according to one embodiment of the disclosure, a thickness (for example, t2 of FIG. 13A) of the first adhesive layer in a region corresponding to the curved region may be formed to be thicker than a thickness (for example, t1 of FIG. 13A) of the first adhesive layer in a region corresponding to the planar region.

In an electronic device according to one embodiment of the disclosure, the first adhesive layer may fill a space between the curved region of the display panel and a curved region of the first base layer.

Meanwhile, in the detailed description of the disclosure, specific embodiments have been described, but various modifications may be achieved without departing from the scope of the disclosure. Therefore, the scope of the disclosure should not be defined as being limited to the described embodiments, but should be defined by the appended claims and equivalents thereof.

The invention claimed is:
1. An electronic device comprising:
   a transparent member;
   a display panel disposed under the transparent member;

an ultrasonic sensor disposed under the display panel and configured to acquire biometric information from an external object adjacent to the transparent member by using an ultrasonic wave having been transmitted through the display panel and the transparent member; and a light absorbing member configured to absorb at least a part of external light incident into the ultrasonic sensor through the transparent member and the display panel, wherein the light absorbing member is disposed between the display panel and the ultrasonic sensor.

2. The electronic device of claim 1, wherein the transparent member includes a planar region and a curved region disposed on at least one edge of the planar region, the display panel includes a planar region and a curved region formed to correspond to a shape of the transparent member, and the light absorbing member is formed to have a different thickness for each of a region corresponding to the planar region and a region corresponding to the curved region.

3. The electronic device of claim 1, wherein the light absorbing member includes a first base layer, a first adhesive layer disposed on the first base layer to be attached to the display panel, and a second adhesive layer disposed under the first base layer.

4. The electronic device of claim 3, wherein the first adhesive layer includes at least one embossed pattern on a surface thereof facing the display panel.

5. The electronic device of claim 4, wherein, the first adhesive layer includes a flat portion formed on a surface thereof facing the display panel, in at least a part of a region corresponding to the ultrasonic sensor.

6. The electronic device of claim 3, wherein the second adhesive layer includes an opening formed in a region corresponding to the ultrasonic sensor, and the ultrasonic sensor is attached to one part of the first base layer, the one part being exposed through the opening, by means of an adhesive agent disposed between the ultrasonic sensor and the one part of the first base layer.

7. The electronic device of claim 3, wherein the light absorbing member further includes a third adhesive layer disposed between the second adhesive layer and the first base layer, and a second base layer disposed under the third adhesive layer, and the second adhesive layer, the second base layer, and the third adhesive layer include openings formed in a region corresponding to the ultrasonic sensor.

8. The electronic device of claim 1, further comprising a shielding layer between the light absorbing member and the ultrasonic sensor, configured to block noise occurring at the display panel, wherein the shielding layer is electrically connected to a grounding portion of the electronic device.

9. The electronic device of claim 3, wherein the light absorbing member includes a black coated layer and a conductive member configured to block noise occurring at the display panel, which are disposed between the first adhesive layer and the second adhesive layer.

10. The electronic device of claim 1, further comprising a buffer member disposed under at least a part of the light absorbing member positioned on a lateral side of the ultrasonic sensor and configured to mitigate impact toward a direction in which the display panel is pressed, wherein the buffer member is formed to be higher than a height of the ultrasonic sensor.

11. The electronic device of claim 10, further comprising a detecting panel disposed under at least a part of the buffer member.

12. The electronic device of claim 11, wherein the detecting panel includes a slit through which a printed circuit board of the ultrasonic sensor is withdrawn.

13. The electronic device of claim 2, wherein the light absorbing member includes a first base layer, a first adhesive layer disposed on the first base layer to be attached to the display panel, and a second adhesive layer disposed under the first base layer.

14. The electronic device of claim 13, wherein a thickness of the first adhesive layer in a region corresponding to the curved region is formed to be thicker than a thickness of the first adhesive layer in a region corresponding to the planar region.

15. The electronic device of claim 14, wherein the first adhesive layer fills a space between the curved region of the display panel and a curved region of the first base layer.

* * * * *